(12) United States Patent
Abramoff et al.

(10) Patent No.: US 8,194,936 B2
(45) Date of Patent: Jun. 5, 2012

(54) OPTIMAL REGISTRATION OF MULTIPLE DEFORMED IMAGES USING A PHYSICAL MODEL OF THE IMAGING DISTORTION

(75) Inventors: Michael Abramoff, University Heights, IA (US); Meindert Niemeijer, Utrecht (NL); Sangyeol Lee, Fishers, IN (US); Joseph Reinhardt, University Heights, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 470 days.

(21) Appl. No.: 12/387,071

(22) Filed: Apr. 27, 2009

(65) Prior Publication Data
US 2010/0061601 A1 Mar. 11, 2010

Related U.S. Application Data

(60) Provisional application No. 61/048,021, filed on Apr. 25, 2008.

(51) Int. Cl.
*G06K 9/00* (2006.01)
(52) U.S. Cl. .................. 382/117; 382/275; 351/211
(58) Field of Classification Search .................. 382/117, 382/275, 284, 294; 351/206, 211, 212
See application file for complete search history.

(56) References Cited

U.S. PATENT DOCUMENTS
6,044,181 A * 3/2000 Szeliski et al. ............... 382/284

OTHER PUBLICATIONS

Abrámoff, M. et al. "Image processing with imagej." *Biophotonics International* 11(7):36-42, hhtp://rsb.info.,nih.gov/ij (2004).
Adelson E. et al. "Pyramid methods in image processing." *RCA Engineer* 29(6):33-41 (1984).
Can A. et al. "A feature-based technique for joint, linear estimation of high-order image-to-mosaic transformations: Mosaicing the curved human retina." *IEEE Trans. On Pattern Analysis and Machine Intelligence.* 24:412-149 (2002).
Can A. et al. "A feature-based robust, hierarchical, algorithm for registering pairs of images of the curved human retina." *IEEE Trans. On Pattern Analysis and Machine Intelligence* 24:347-364 (2002.
Can A. et al. "Rapid automated tracing and feature extraction from retinal fundus images using direct exploratory algorithms." *IEEE Trans. On Information Technology in Biomedicine* 3:125-138 (1999).
Chanwimaluang T. "Hybrid retinal image registration." *IEEE Trans. On Information Technology in Biomedicine* 10:129-142 (2006).
Choe T. et al. "Optimal global mosaic generation fro retinal images." *Int. Conf on Pattern Recognition.* 3:681-684 (2006).
Hackel R. and Saine P. "Creating retinal fundus maps." *J. Opthalmic Photography* 27(1):10-18 (2005).
Maintz J. and Viergever M. "A survey of medical image registration." *Medical Image Analysis* 2(1):1-36 (1998).
Ritter N. et al. "Registration of stereo and temporal images of the retina." *IEEE Trans. On Medical Imaging* 18:404-418 (1999).

(Continued)

*Primary Examiner* — Kevin Pyo
(74) *Attorney, Agent, or Firm* — Ballard Spahr LLP

(57) ABSTRACT

Methods and systems for image registration implementing a feature-based strategy that uses a retinal vessel network to identify features, uses an affine registration model estimated using feature correspondences, and corrects radial distortion to minimize the overall registration error. Also provided are methods and systems for retinal atlas generation. Further provided are methods and systems for testing registration methods.

27 Claims, 38 Drawing Sheets

OTHER PUBLICATIONS

Staal J. et al. "Ridge-based vessel segmentation in color images of the retina." *IEEE Trans. On Medical Imaging* 23:501-509 (2004).

Toderici G. et al. "Evaluation of variability and significance of fundus camera lens distortion." In Proc. 26$^{th}$ *Annual Int. Conf of the IEEE Engineering in Medicine and biology Society*, pp. 1-5 (San Francisco, CA) (Sep. 2004).

Vincent, L. "Morphological grayscale reconstruction in image analysis: Applications and efficient algorithms." *IEEE Trans. On Image Processing* 2:176-201 (1993).

Weng J. et al. "Camera calibration with distortion models and accuracy evaluation." *IEEE trans. On Pattern Analysis and Machine Intelligence.* 14(10):965-980 (1992).

Xu J. and Chutatape O. "Comparative study of two calibration methods on fundus camera." In *Proc. 26$^{th}$ Annual Int. Conf of the IEEE Engineering in Medicine and Biology Society.* pp. 576-579 (Cancun, Mexico) (2003).

Zomet A. "Seamless image stitching by minimizing false edges." *IEEE Trans. On Image Processing* 15:969-977 (2006).

* cited by examiner

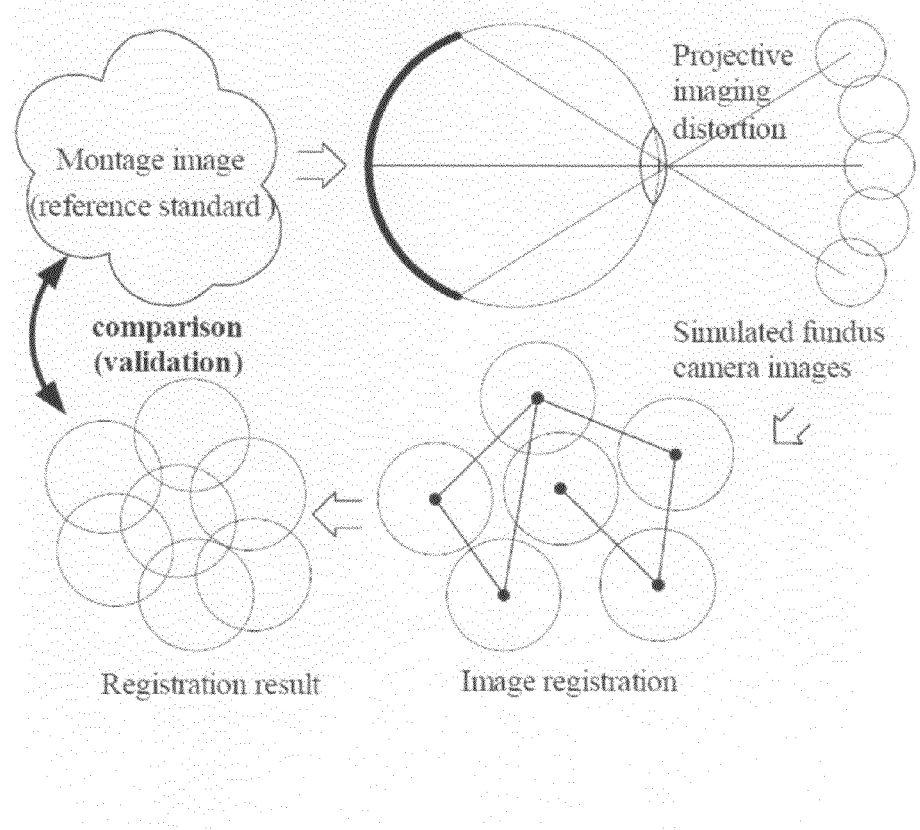

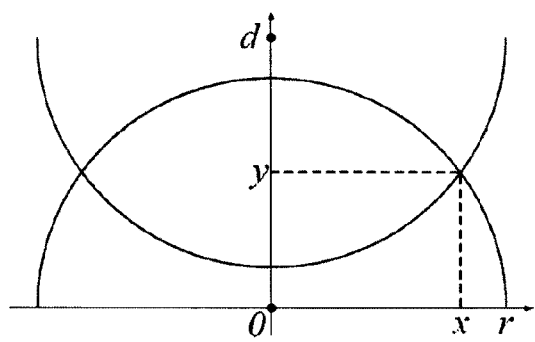
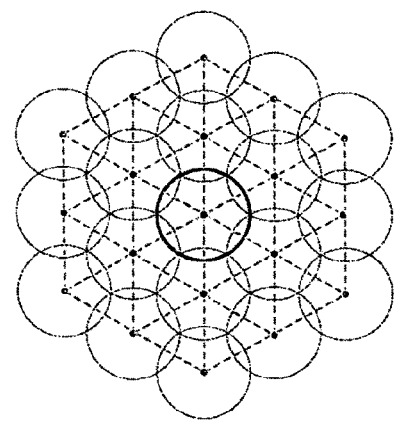
FIG. 18a  FIG. 18b

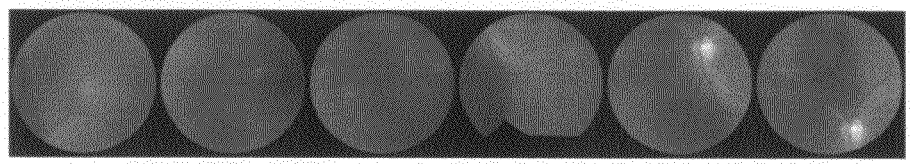
FIG. 35a Images by montage cutting; $C_0, C_1, \cdots$ and $C_6$ from left to right.
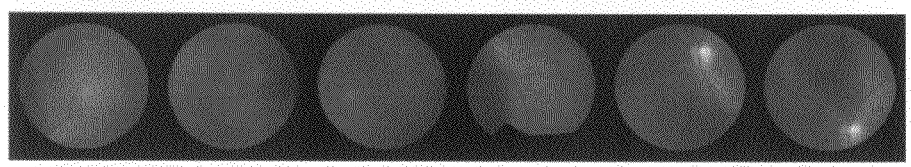
FIG. 35b Simulated retinal images to be used for the input to the registration.
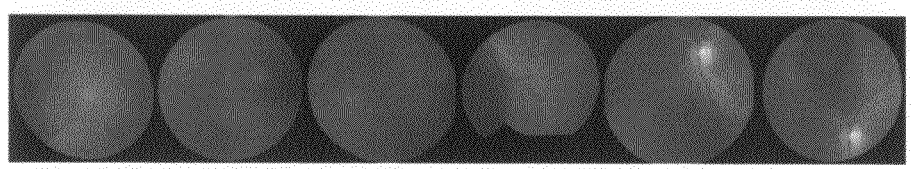
FIG. 35c Restored images following the registration by the affine model.
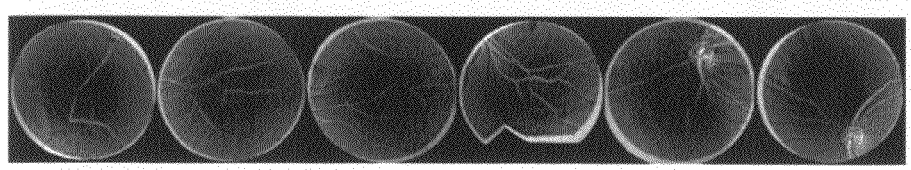
FIG. 35d Intensity difference between the montage cuts (row (a)) and the restored images (row (c)).

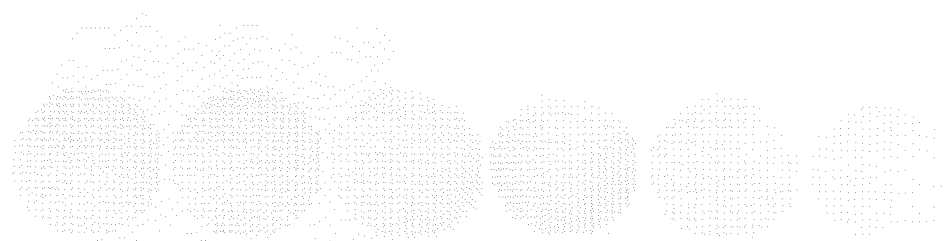
FIG. 37a  Similarity model
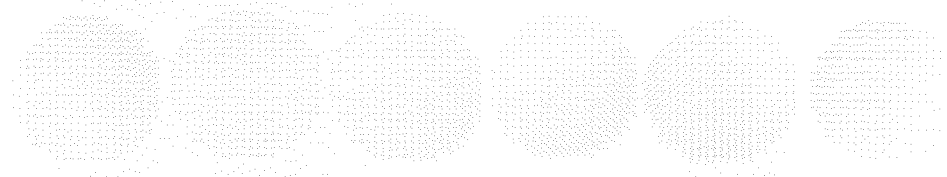
FIG. 37b  Affine model
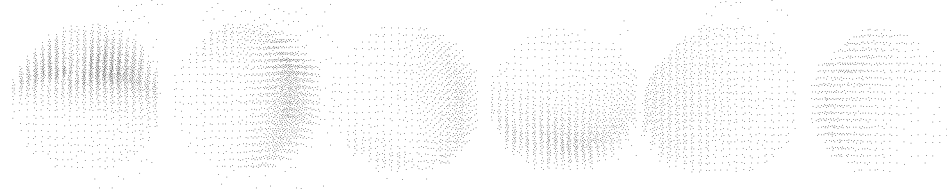
FIG. 37c  Quadratic model
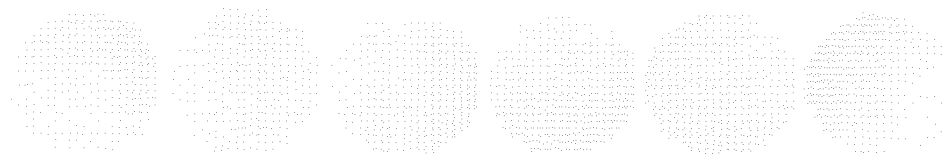
FIG. 37d  RADIC model

OPTIMAL REGISTRATION OF MULTIPLE DEFORMED IMAGES USING A PHYSICAL MODEL OF THE IMAGING DISTORTION

CROSS REFERENCE TO RELATED PATENT APPLICATION

This application claims priority to U.S. Provisional Application No. 61/048,021 filed Apr. 25, 2008, herein incorporated by reference in its entirety.

GOVERNMENT SUPPORT CLAUSE

This invention was made with government support under NIH EY017066 awarded by the National Institutes of Health. The government has certain rights in the invention.

SUMMARY

Methods and systems for image registration implementing a feature-based strategy that uses a retinal vessel network to identify features, uses an affine registration model estimated using feature correspondences, and corrects radial distortion to minimize the overall registration error. Also provided are methods and systems for retinal atlas generation. Further provided are methods and systems for testing registration methods.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 17 is a flow diagram illustrating a method for generating a set of simulated retinal images with a known reference standard for registration;

FIG. 18a shows the outline of two partially overlapping circular regions with radius r;

FIG. 18b illustrates that each cut can be centered at the edge of an equilateral triangle whose side length is d;

FIG. 35a provides images by montage cutting; $C_0, C_1, \ldots$ and $C_6$ from left to right;

FIG. 35b is simulated retinal images to be used for the input to the registration;

FIG. 35c is restored images following the registration by the affine model;

FIG. 35d is the intensity difference between the montage cuts and the restored images;

FIG. 37 illustrates registration error maps for the image set for $C_1, C_2, \ldots,$ and $C_6$ from left to right using different models.

DETAILED DESCRIPTION

Figure 1:
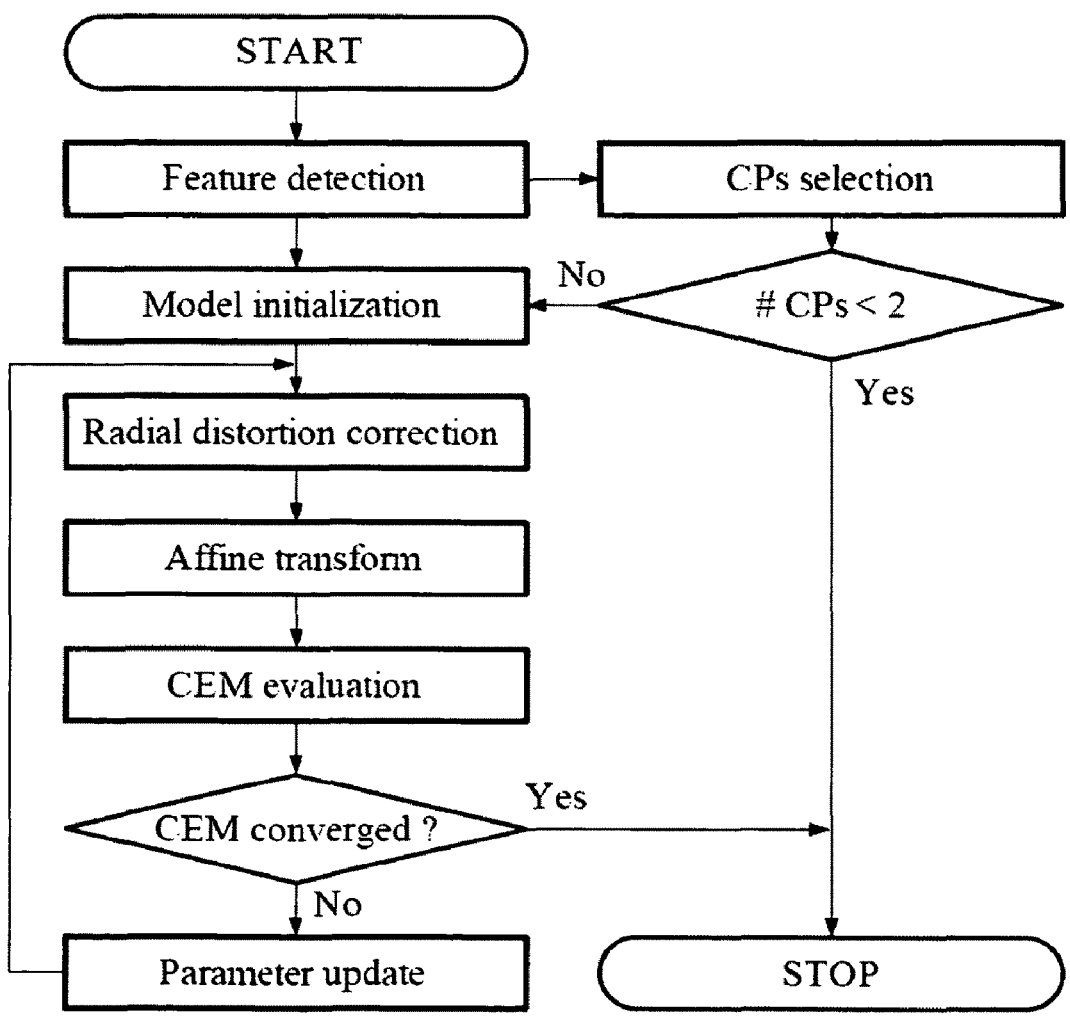
FIG. 1 is an exemplary flow diagram for methods for retinal image registration with distortion correction.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

The human retina is the only part of the central nervous system that can be imaged directly, and retinal imaging has become an important tool for diagnosis and screening of ophthalmologic diseases such as diabetic retinopathy, age-related macular degeneration (AMD), glaucoma, etc. Similar to looking through a small keyhole into a large room, imaging the fundus with an ophthalmologic camera allows only a limited region of interest (ROI) to be viewed at a time. This limited view of the fundus camera makes it difficult to perform a comprehensive examination of the retina. Thus retinal image mosaicing, the process of stitching together multiple images to obtain a larger ROI, allows the ophthalmologist a panoramic view of the human retina.

Fundus imaging generally begins with taking a series of overlapping images showing different parts of the retina. The adjacency information found in the overlapping regions can be used to align pairs of images. Mosaicing is then accomplished by extending the pairwise registration to multiple cases. Considering global mosaicing as the graphical representation of pairwise connectivity weighted with registration error, the importance of pairwise registration is paramount.

Fundus image registration has been attempted in both the intensity and feature domains. The intensity-based registration measures, such as cross-correlation or mutual information, work well when the overlapping area occupies a significant amount of image, but they are more time-consuming and sensitive to local contrast variation than the other. Feature-based methods need an additional processing step to extract features, but are potentially more robust to uneven illumination and capable of incorporating application-specific rules. The image acquisition setup in ophthalmology usually limits motion of the patient's head by holding the forehead fixed against a frame. The fundus camera is translated (or equivalently, eyes are rotated) to move the imaging field of view, so translation is the dominant transformation between pairs of images. There exists a small amount of scaling, rotation, and shearing even if the human retina can be modeled as a stationary object, so an affine model can be used to address the retinal image registration problems.

Retinal image registration is the problem of seamlessly stitching together partially overlapped images that exhibit a radial distortion due to the imaging geometry. The partial overlap weakens the reliability of intensity measures, but also decreases the feasible number of matching features. Provided herein are methods and systems that can correct radial distortion due to camera optics and the sphere-to-plane projection during image acquisition prior to registration. In an aspect, the methods and systems can register retina image pairs with limited overlap and radial distortion. The methods and systems can implement a feature-based strategy that uses the retinal vessel network to identify features, uses an affine registration model estimated using only two feature correspondences, and corrects radial distortion to minimize the overall registration error.

In an aspect, illustrated in FIG. 1, provided are methods for retinal image registration with distortion correction. Feature correspondence points (CPs) can be detected within a target and a reference image to be registered. Measurements derived from vessel lines and their branchpoints or retinal pigmentation patterns can be used as feature vectors, since the vessel network is easy to distinguish from the background and is distributed over most of the retina. CPs can be selected. Two CPs with the highest spatial and vector space correlation can be used to initialize the affine model. Radial distortion correction can be applied to the target and the reference image. An affine transformation can be applied to the target images. Vessel centerline error measure (CEM) can be determined between a reference image and the target images. If CEM has converged the process can be completed, if not, parameters for the affine model can be updated and the distortion correction process repeated. The registration is thu refined by searching for the model parameters and radial distortion terms that give the minimum registration error as measured by the vessel centerline error measure (CEM) between reference and target images. The steps of the methods disclosed can be performed in various orders. For example, feature detection can be performed after radial distortion correction.

In another aspect, two images which are taken from the same eye with some spatial overlapping can be received. One of the images can be identified as a reference image and the other as a target image. A known range within which radial distortion can happen can be assumed, for example, the range can be estimated by the fundus camera setting and the average eyeball radius. The methods and systems can then search for an optimal value of radial distortion which can be represented by the parameter k. k-values can be selected via a bisection search method. For example, if the range is [−1, +1]; then three values can be selected (i.e. −0.5, 0.0, +0.5). Using the three k-values, radial distortion correction can be independently applied to both the reference image and the target image. Feature correspondence detection can be performed to obtain the locations of corresponding vessel branches (or crossings). Using the correspondences, an affine transformation matrix can be initialized. Beginning from the initial matrix, the methods and systems can search for an optimal parameter that gives a minimum CEM using the a minimization method, such as Powell's method. The distortion correction, feature correspondence detection, affine transformation matrix initialization, and parameter searching can be performed independently for each of the three k-values selected previously, resulting in three minimum CEMs. The methods and systems can now, select a k-value with a global minimum CEM. If k-search range is below a pre-specified tolerance, the methods and systems can end. Now, the k-value and the affine matrix are the values when we get global minimum CEM. The distortion corrected reference and target images can now be combined to form a montage image (for example, by coordinate transformation). In an aspect, if two pixels overlap (i.e. transformed to a same point) in the montage image, then the intensity can be determined of the overlapped pixel (or color) by distance weighted blending scheme. Alternatively, the original value of the overlapped pixel can be maintained.

Figure 2A:
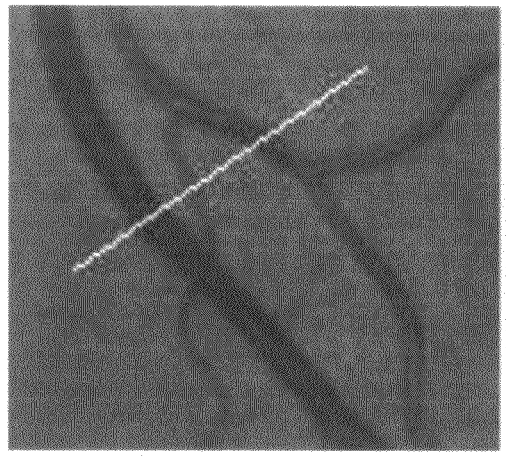
FIG. 2a is an image showing vessel reflex.
Figure 2B:
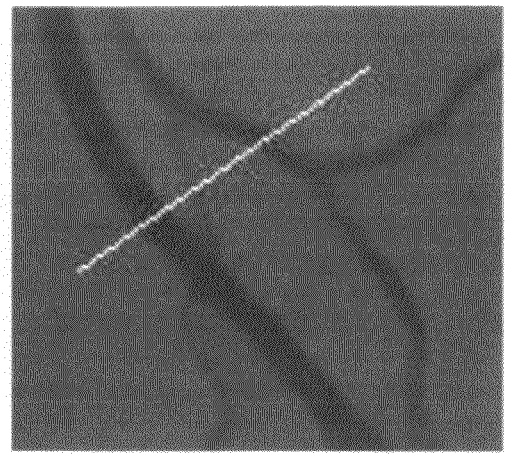
FIG. 2b an image after morphological reconstruction.
Figure 2C:
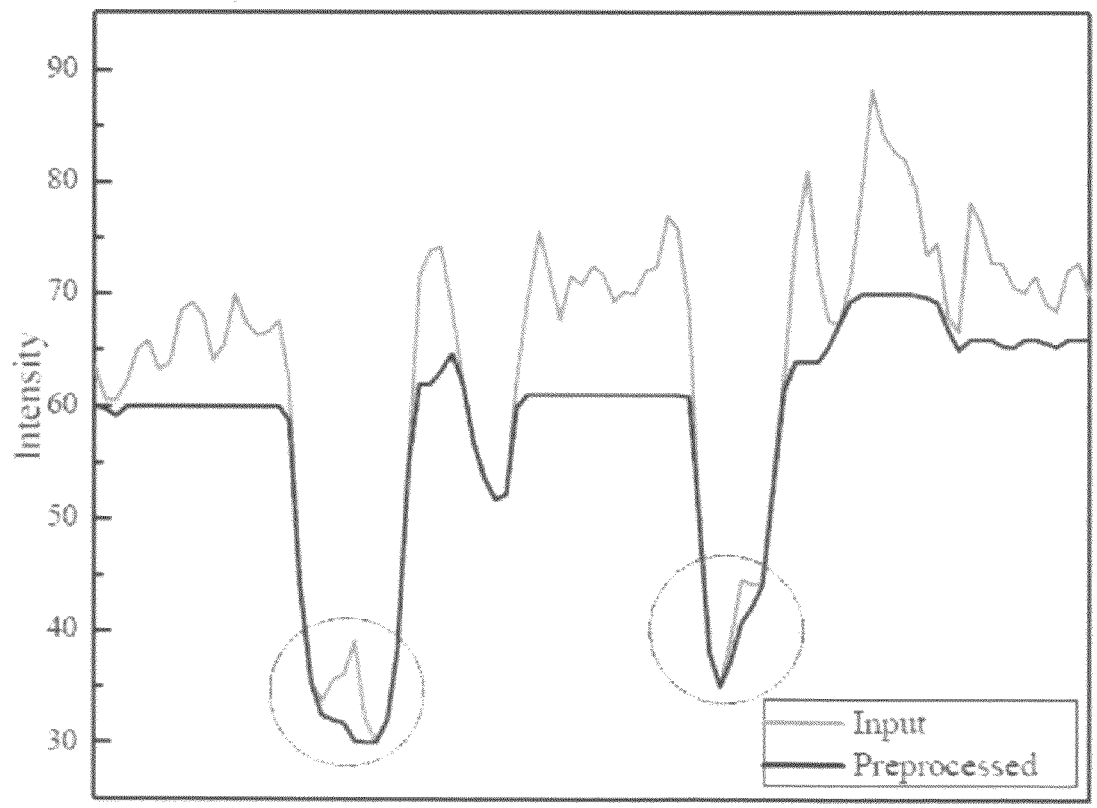
FIG. 2c is intensity profiles measured along the diagonal white lines in FIG. 2(a) and FIG. 2(b) before and after preprocessing.

The vasculature in the retinal images provides the most prominent features for image registration. The methods and systems can extract vessel centerlines and identify vessel branch points as CP candidates. An interesting characteristic of a retinal image is the appearance of vessel reflex caused by the specular reflection from the tube-like vessel geometry. Vessel reflex results in a bright line along the centerline of the normally dark vessel segment. A fast morphological reconstruction can be used to suppress vessel reflex and image background noise. The morphological reconstruction using h-max operator is a fast version of an iterative reconstruction with three steps: raster scanning, anti-raster scanning, and propagation. Since the retinal vessel has an elongated tube-like shape, only the first two steps are used in an aspect and as a result, the reconstruction can be completed with two passes through the image data. FIG. 2 shows an example illustrating retinal vessel reflex and results of the preprocessing step with h-max set to 10% of intensity range. FIG. 2(a) is an image showing vessel reflex, FIG. 2(b) image after morphological reconstruction, and FIG. 2(c) intensity profiles measured along the diagonal white lines in FIG. 2(a) and FIG. 2(b) before and after preprocessing. As is evident from FIG. 2(c), the vessel reflexes (see circles) and background noise are eliminated while keeping the edge location. This preprocessing step might inadvertently remove small vessel lines, but overall will contribute to more consistent outcomes under intensity variations between images.

Explicit vessel segmentation followed by line thinning can produce vessel centerlines. Since detected vessel lines can be used to estimate the registration error during optimization, the vessel lines should be detected with a high degree of consistency between images. Extraneous line segments without true correspondences may introduce erroneous vessel line matches which are almost impossible to exclude during the optimization step.

Figures 3A, 3B, 3C, 3D:
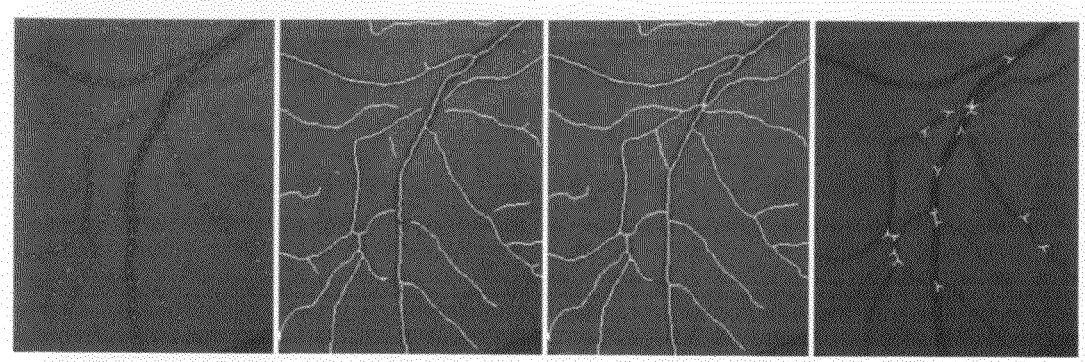
FIG. 3a illustrates seed detection.
FIG. 3b illustrates vessel tracing.
FIG. 3c illustrates endpoint extension.
FIG. 3d illustrates branch estimation.

To address this problem, a conservative vessel line extraction can be used that tracks candidate vessel segments by tracing the intensity valleys in vessel profiles. Tube-like vascular structures are enhanced using the Hessian operator. For an image I(x, y), the Hessian operation H(x, y) is given by $$H(x, y) = I(x, y) \otimes G(x, y; \sigma)$$
$$= I(x, y) \otimes \begin{bmatrix} G_{xx}(x, y; \sigma) & G_{xx}(x, y; \sigma) \\ G_{yx}(x, y; \sigma) & G_{yy}(x, y; \sigma) \end{bmatrix}$$

where G(x, y; σ) is a 2D Gaussian probability distribution function with zero mean and standard deviation (scale) σ, and ⊗ is the convolution operator. The Hessian operator produces a 2×2 matrix for each pixel, and the matrix eigenvalues and eigenvectors provide information on the ridgeness of the intensity profile. The largest eigenvalue is associated with the eigenvector that is orthogonal to vessel line direction. Consequently, this tracing strategy successively probes points that correspond to the perpendicular direction of eigenvector with the largest eigenvalue. The tracing can start from seed points. For each row and column on virtual grid lines overlaid on the image, center points of the local gradient pair found in an average vessel width range can be pushed into the seed list. Vessel tracing can be performed independently for each seed, and terminates when a trace meets another trace, when the Hessian eigenvector changes its direction abruptly, or when two eigenvalues are similar in magnitude. When the tracing is completed, end points of the traced segments can be collected to make an endpoint list. The list can be utilized to delete short line segments due to false seed detection and to connect local breaks or lateral branching in line segments. A use of the endpoint list is the generation of line branches. In case the trace reaches vessel branches or bifurcations, tracing stops and can give disconnected vessel segments since the Hessian operator only responds strongly for elongated structures. In an aspect, the methods provided trace back from the endpoints to extrapolate vessels. The crossing of two or more extrapolated vessel lines can be considered a branch center. FIG. 3(a) illustrates seed detection, FIG. 3(b) vessel tracing, FIG. 3(c) endpoint extension, and FIG. 3(d) branch estimation. In all cases the lines and points are superimposed over the preprocessed input image. As shown in FIG. 3(b), incomplete line segments are either merged or eliminated during endpoint processing. In the following steps, the vessel centerlines of FIG. 3(c) and the branch vectors of FIG. 3(d) are used for registration error calculation and for correspondence selection respectively.

Figure 4A:
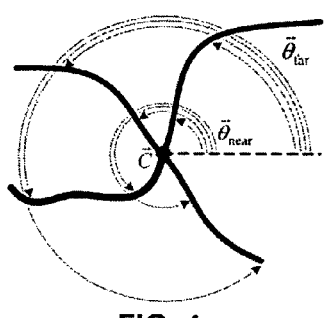
FIG. 4a illustrates branch vector elements.

Branch centers can be characterized by their location and the orientation of the branches leaving the branch center. For a branch center located at $\vec{C}=(C_x, C_y)$, the branch vector $\vec{B}$ is given by $$\vec{B} = \{\vec{C}, \vec{\theta}_{near}, \vec{\theta}_{far}\} = \{C_x, C_y, \theta_{near}^0, \theta_{near}^1, \theta_{near}^2, \theta_{near}^3, \theta_{far}^0, \theta_{far}^1, \theta_{far}^2, \theta_{far}^3\},$$

where $\theta_{near}^i$ and $\theta_{far}^i$ are the three branch angles measured at 3σ and 6σ from $\vec{C}$ for $i^{th}$ branch, i=0, 1, 2, 3 (see FIG. 4(a)).

Figure 4B:
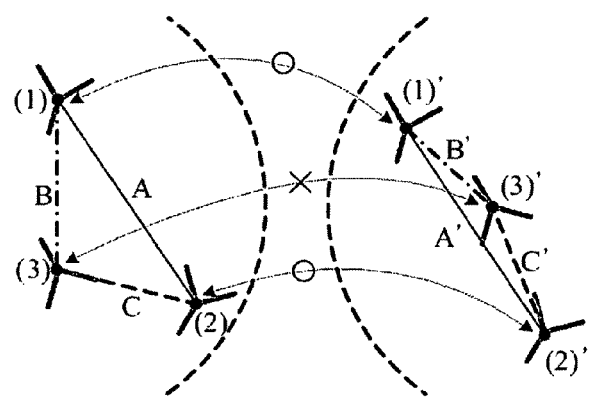
FIG. 4b illustrates CP selection using branch vectors and spatial locations.

Feature correspondence can first be evaluated using branch angles, so a branch in the reference image is paired with the branch in the target image that gives the smallest sum of angle difference. Then a graph-based spatial correspondence can be considered for further refinement of branch pairs. FIG. 4(a) illustrates branch vector elements and FIG. 4(b) CP selection using branch vectors and spatial locations. In this example branch centers (1) and (1)', (2) and (2)', and (3) and (3)' matched as CPs. CPs (1)-(1)' and (2)-(2)' were selected to initialize the affine model. FIG. 4(b) is an example where three branch pairs are involved and (3) and (3)' are incorrectly paired by angle criterion. In the graph, the node represents branch center and the edge weight is determined by Euclidean distance between nodes. By measuring the difference in edge angle and weight, the edge pair A and A' turns out to have the highest similarity, so (1)-(1)' and (2)-(2)' are selected for the CPs. In case more than two CPs have high similarity within tolerance, a pair of CPs with the highest edge weight can be selected. After the two CPs are selected, the CPs can be used to estimate the initial parameters of the affine model.

Figures 5A, 5B, 5C:
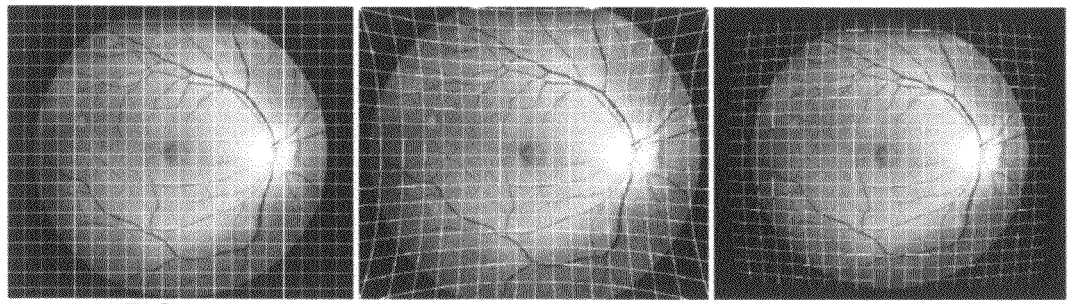
FIG. 5a illustrates radial distortion models under no distortion (k=0.0)
FIG. 5b illustrates radial distortion models under pincushion distortion (k=0.2)
FIG. 5c illustrates radial distortion models under barrel distortion (k=−0.2)

During the retinal imaging process, light rays reflect from the retina after traveling the two-way path through the cornea and a series of optical lenses, creating a nonlinear distortion. The retinal image is acquired by projecting the 3D spherical retinal surface, through the lenses, onto the 2D imaging plane. If the optical effects are modeled using a single lens equivalent to the optical cascade, the distortion in retinal imaging can be described as a combination of two coordinate deformations: the optical distortion and the spherical-to-planar projection. The former, despite using a fundus camera that is well calibrated to compensate for path deformation at the cornea, still causes a pincushion distortion as images are acquired away from the optical axis. A more significant distortion is caused by the projection of the curved retinal surface to a planar image space, resulting in a barrel distortion. As shown in FIG. 5, the amount of distortion of both types is dominated by the distance from the optical center, commonly known as radial distortion. FIG. 5 illustrates radial distortion models under FIG. 5(a) no distortion (k=0.0), FIG. 5(b) pincushion distortion (k=0.2), and FIG. 5(c) barrel distortion (k=−0.2).

The combined radial distortion can be modeled as a coordinate transformation where a point u on the spherical surface of the eye is transformed as a function of position off of the optical axis to give the distorted coordinate v. The geometric distortion can be corrected by estimating $\hat{v}$ from u using $$\hat{v} = u \cdot \left(1 + \sum_{n=1}^{\infty} k_n r^{2n}\right),$$

where the $k_n$ terms are the radial distortion coefficients and r is the distance from optical axis center to u. As used herein, only the n=1 term in the series is considered, i.e., $\hat{v}$=u·(1+kr$^2$), since this accounts for 95% of radial distortion. However, other values greater than 1 can be used for n. Consequently k=$k_1$ becomes the only parameter in the distortion correction model. The sign of k determines the type of distortion; k<0 indicates barrel distortion and k>0 indicates pincushion distortion.

The radial distortion parameter k and the parameters of the affine transformation can be estimated during an optimization step. The radial distortion parameter k can be initially set to zero (no radial distortion). The affine model matrix M can be initialized by the relative scaling, rotation, and translation calculated from the two CPs selected during feature correspondence points selection. Since k and M are independent of each other, they can be updated separately. k can be determined using bisection search and M can be refined using Powell's method, as known in the art, to reduce the centerline error measure, CEM, $$CEM = \frac{1}{N}\sum_{n=0}^{N-1}|v_n^{(r)} - \hat{v}_n| = \frac{1}{N}\sum_{n=0}^{N-1}|v_n^{(r)} - v_n^{(t)}M|,$$

where N is the vessel line length and $v^{(r)}$ is the closest point in the reference image after transforming a point $v^{(t)}$ in the target image.

After completing the optimization step, intensity blending can be used to combine the two registered images to form a composite image. In an aspect, use pixel averaging can be used to combine the two images together in order not to artificially suppress ghost vessels that serve as a visual indicator of registration performance. More sophisticated image blending techniques, such as pyramidal blending and gradient blending, can also be used.

In another aspect, the radial distortion can be modeled as a coordinate transformation where a point u on the spherical surface of the eye is transformed by a function of position off of the optical axis to give the distorted point coordinate $\hat{u}$, which can be mathematically represented by a Taylor series expansion:

$$\hat{u} = D_{k_n}^{-1}(u) = u \cdot \left(1 + \sum_{n=1}^{\infty} k_n r^{2n}\right)^{-1},\quad (3)$$

where the $k_n$ terms are the radial distortion coefficients and r is the distance from the focal center to u.

Figure 6A:
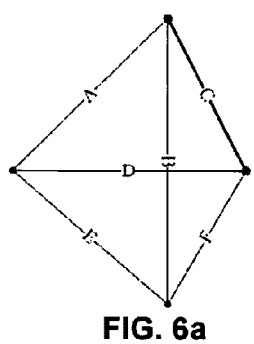
FIG. 6a illustrates inlier estimation for graph correspondence (graph from reference image)
Figure 6B:
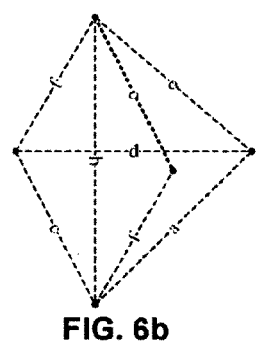
FIG. 6b illustrates inlier estimation for graph correspondence (graph from target image)
Figure 6C:
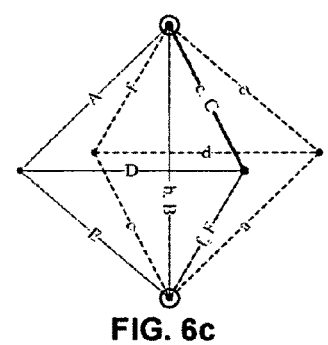
FIG. 6c illustrates inlier estimation for graph correspondence (graphs overlaid with edge pair (C, c))

The feature vectors composed of vessel centerline and branches can be generated by Hessian-based tracing and the CPs can be determined by the inlier detection using the centerline branches. A undirected fully-connected graph G(v, e) can be built for the reference and the target image respectively by placing all branches at graph nodes. Next, G can be refined by calculating the vector dissimilarity defined as d=||$e_{ref}$−$e_{tgt}$||, where $e_{ref}$ and $e_{tgt}$ represent edge vectors of graphs from the reference and the target image respectively. While eliminating edges with large d, each edge pair with small d value is given the same label as shown in FIG. 6(a) and FIG. 6(b). Note an edge can be mapped multiple times. Ambiguity in determining correspondence points can be resolved by overlaying two graphs and detecting spatially correlated nodes or inliers. FIG. 6 illustrates inlier estimation for graph correspondence: FIG. 6(a) graph from reference image, FIG. 6(b) graph from target image, and FIG. 6(c) graphs overlaid with edge pair (C, c); two nodes are selected as inliers. FIG. 6 is an example of inlier detection when the edge pair (C, c) is selected as overlaying axis. Inlier detection step repeats for all edge pairs and a node pair can be selected which has the largest length among the nodes with the highest frequency of inlier matching.

Let the coordinate transformation matrix IM relocate a point u=[x y 1]$^T$ to v=[X Y 1]$^T$. In case of affine model, IM$_{affine}$ is defined as a 2×3 parameter matrix, and a 2×6 parameter matrix is used for quadratic model with u=[x$^2$ y$^2$ xy xy 1]$^T$. The methods can be implemented by considering the first term of infinite series in (3) which can account for 95% of radial distortion, thus k=$k_1$ becomes the only parameter for distortion correction. Since the methods provided have the form of inverse radial distortion correction followed by affine transformation, it can be mathematically related with the affine model as $$v=IM_{RADIC}(u)=IM_{affine}(D_k^{-1}(u)) \quad (2)$$

In an aspect, k can be set to zero (no distortion) by default, and IM$_{affine}$ can be initialized by the relative scaling, rotation, and translation calculated from the CPs. Since k and IM$_{affine}$ are independent of each other, they can be updated separately; k can be determined using bisection search and IM$_{affine}$ can be refined using Powell's method, as is known in the art, to minimize registration error measurement. Cessel centerline error measurement (CEM) can be used. CEM is known in the art of retinal image registration. Given a set of vessel centerlines $v^{(r)}$ for the reference image and $v^{(t)}$ for the target image, the CEM is given by $$CEM = \frac{1}{N}\sum_{i=0}^{m-1}|v_i^{(r)} - \hat{v}_i^{(t)}|[\text{pixels}] \quad (3)$$

and $$\hat{v}_n^{(r)} = M^{(r)}(u_i^{(r)}),\ v_i^{(t)} = \arg\min_{i \in 0,1,\ldots,n-1}\|v_i^{(r)} - M^{(t)}(u_j^{(t)})\|,$$

where m=|$v^{(r)}$| and n=|$v^{(t)}$|, and IM$^{(r)}$=IM$^{(t)}$ for the methods provided and IM$^{(r)}$ is identity matrix for the others.

Figures 7A, 7B, 7C:
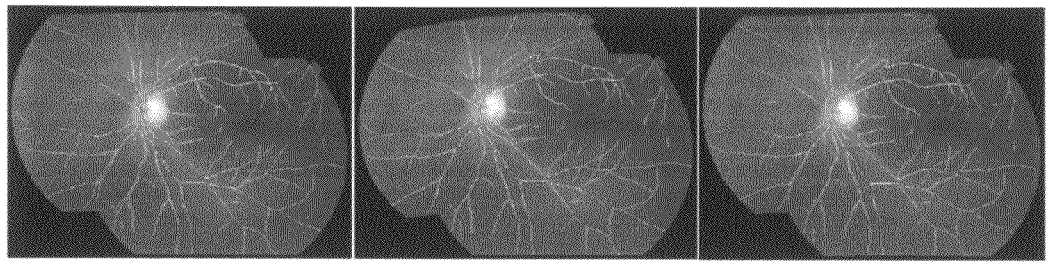
FIG. 7a illustrates pairwise registration using affine model.
FIG. 7b illustrates pairwise registration using quadratic model.
FIG. 7c illustrates pairwise registration using model provided herein.

Registration results using different transformation models are shown in FIG. 7, where the left image is registered to the right image. FIG. 7 illustrates pairwise registration using FIG. 7(a) affine model (CEM=1.82), FIG. 7(b) quadratic model (CEM=1.52), and FIG. 7(c) model provided herein (CEM=1.64, k=0.04); vessel centerlines are overlaid for visual comparison of CEM. In the sense of the CEM, the quadratic model produces the smallest CEM, however, it should be noted that the CEM is an error metric calculated only in the overlapping region. The less inter-image overlaps, the less reliable CEM is for measuring registration error. Even though the images are well aligned in the overlapping region as shown in FIG. 7(b), the geometry distortion in the non-overlapping region is noticeable. The distortion of target image, which appears to have the wrapped coordinate system, becomes the primary reason for inconsistent pairwise coordinate registration, thus causing the indirect joint registration problem in the mosaicing application. As shown in FIG. 7(c), the methods provided take advantage of the linear registration by affine model and the retina curvature.

For retinal montage generation, the methods can determine registration pairs using an inter-image connectivity tree that describes the spatial relationship of retinal images. Since the distortion correction model provided recovers the spherical-to-planar projective distortion, it is possible to directly extend the pairwise registration strategy to multiple image registration application.

Figure 8A:
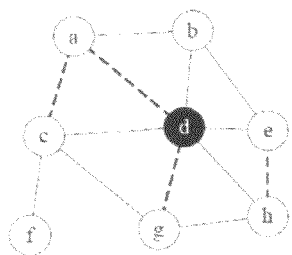
FIG. 8a illustrates connectivity tree construction (Primitive tree)
Figure 8B:
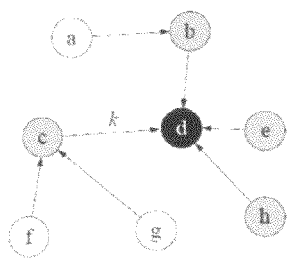
FIG. 8b illustrates connectivity tree construction (Tree depth from the anchor image)
Figure 8C:
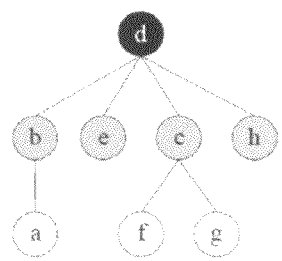
FIG. 8c illustrates connectivity tree construction (Final connectivity tree)
Figure 9A:
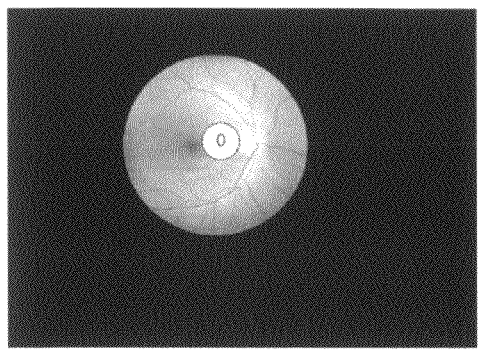
FIG. 9a illustrates registration cascade for montage generation when added images at level 0.
Figure 9B:
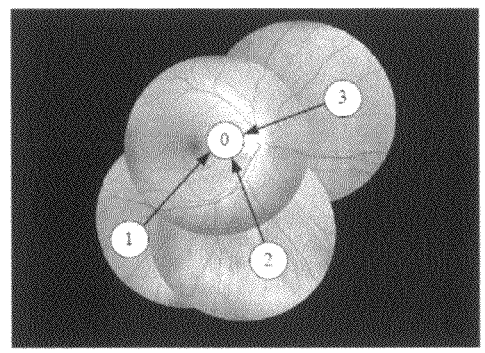
FIG. 9b illustrates registration cascade for montage generation when added images at level 1.
Figure 9C:
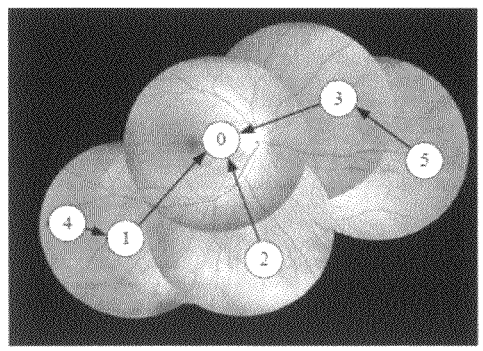
FIG. 9c illustrates registration cascade for montage generation when added images at level 2.
Figure 9D:
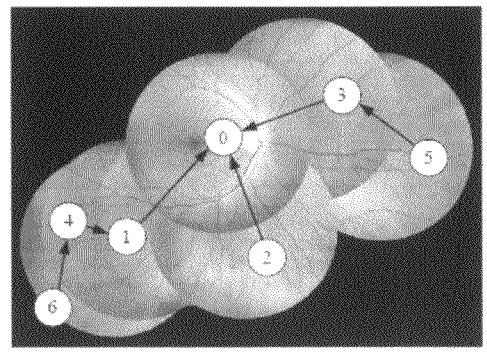
FIG. 9d illustrates registration cascade for montage generation when added images at level 3.

A condition for registering two images is that they should have some overlapping region, and more conditions may be required depending on the specific registration algorithm. A pair of images can be considered "connected" if more than two CPs are found. Note that spatially overlapping images can be "disconnected" depending on the feature (i.e. vessel branch or crossing) distribution. From a primitive tree based on the connectivity, an anchor image can be selected which has the highest connectivity. The tree considers the shortest path from the anchor image to a certain node to construct a tree structure rooted at the anchor image (see FIG. 8 for example). FIG. 8 illustrates connectivity tree construction. FIG. 8(a) Primitive tree: solid lines indicate overlapping and connected images; dotted lines indicate overlapping but disconnected images. Node d is selected as the anchor image. FIG. 8(b) Tree depth from the anchor image; the distortion coefficient k is determined from node pair c and d for this montage. Arrows are drawn from target image to reference image. FIG. 8(c) Final connectivity tree.

In an aspect, the assumption can be made that all images involved in mosaicing are acquired under identical imaging conditions. Thus, all images of a given subject undergo the same geometric distortion. Since a characteristic of the distortion correction model provided is that spherical-to-planar projective distortion occurred during retinal imaging can be recovered, and the distortion correction model provided transforms the projected coordinate system to a planar linear space. Thus, multiple images can be registered by applying a linear (i.e. affine) transform model to the images following the distortion correction with the same parameter k.

k can be estimated by performing a pairwise registration between the anchor image and the directly connected image with the highest connectivity. As shown in FIG. 8(b), only the connections on the shortest path from the anchor image to a certain node are considered to determine connectivity level L. The connectivity information can be converted into a tree structure that is rooted by the anchor image (see FIG. 8(c)).

The methods provided extend pairwise registration by successively aligning images based on the connectivity hierarchy. The radial distortion is corrected independently for all images so the images are transformed to a planar linear space where the affine transformation is to be applied. First, register images directly connected to the anchor image in a pairwise manner, and each of the first level images serves as an anchor for one or more images in the second level. This cascaded process can continue until the registration reaches the leaf nodes. The process is illustrated in FIG. 9 and mathematically represented by $$v^l = \mathbb{M}_{affine}^l (D_k^{-1}(v)) \text{ and } \mathbb{M}_{affine}^l = \prod_{i=1}^{l} \mathbb{M}_{affine}^{(i,i-1)}$$

where $v^l$ is a registered pixel location of v located at level l and $M^{(i,i-1)}$ is the pair-wise registration matrix for registering an image at level i−1 to i. FIG. 9 illustrates registration cascade for montage generation (k=0.02) when added images at FIG. 9(a) level 0 (anchor image), FIG. 9(b) level 1, FIG. 9(c) level 2, and FIG. 9(d) level 3. The cascaded registration in distortion corrected space-requires O(n) registrations for n images, which is computationally more efficient than the previous methods that require $O(n^2)$ registrations.

Figures 10A, 10B, 10C:
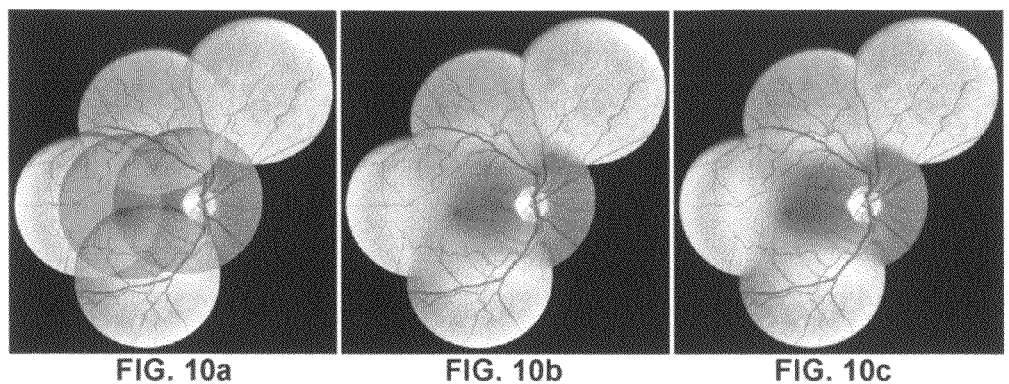
FIG. 10a illustrates intensity blending results for p=0.
FIG. 10b illustrates intensity blending results for p=1.
FIG. 10c illustrates intensity blending results for p=2.

Retinal images commonly have inter- and intra-intensity variation due to inconsistent illumination. In particular, the image intensity drops significantly as distance from the focal center increases because of the vignetting effect caused by the fundus camera optics and retina curvature. Pixel intensities mapped to the same location in the montage can be blended together in a sophisticated way to produce a visually pleasing montage image. The advantage of intensity blending can be more than eliminating image boundaries. The clinical features of retinal vessels are less visible near the region of interest boundary so the blending method can be designed to assign more weight to the image with higher quality. An efficient way of blending is to apply variable weight that depends on the spatial location. The weight w can be selected that is inversely proportional to the distance from the focal center to a certain pixel so the intensities in the overlapping region are mixed to result in a seamless montage. For the pixel at v where multiple images overlap, the pixel intensity I can be blended by $$I(v) = \frac{\sum_i w_i^p I_i(v)}{\sum_i w_i^p},$$

where p is used to adjust for the vignetting effect. For example, p=2 can be used and FIG. 10 compares pixel averaging and distance-weighted blending with p=1 and p=2. FIG. 10 illustrates intensity blending results for different p's. FIG. 10(a) p=0: intensity averaging, FIG. 10(b) p=1: linear distance weighted blending, and FIG. 10(c) p=2: quadratic distance weighted blending.

In another aspect, provided are methods and systems for retinal atlas mapping. An anatomical atlas can provide a reference anatomic structure described within an associated coordinate system. In the atlas coordinate system, individual anatomical structures with respect to that of the atlas can be normalized, so that interrelationships between anatomic structures can be defined. The atlas can serve as a template so that a new image can be compared to the atlas to assess distance and normality vs. abnormality. A retinal atlas can serve as a reference for the retina using an anatomically-defined coordinate system. The retinal surface is 3D structure. Provided herein are methods and systems that can project the 3D anatomy onto a 2D atlas. Such an atlas can be used, for example, to predict the expected pixel value (e.g., RGB components) and confidence interval at a specific retinal coordinate, and to measure deviations from the expected value as part of a computer-aided diagnosis system. For segmentation applications, the retinal atlas can provide a vessel location probability map that can be used to initialize a vessel segmentation method. In a retinal registration problem, the atlas can provide the underlying coordinate system to which all images are registered.

From a computational anatomy perspective, the atlas can serve as a resource to help answer questions about variation across a population. For example, little is known about the spatial relationships between the optic disk, fovea, macula, and main vessels, and how these structures vary in position, size, and shape across a population, based on genetic factors, or from environmental conditions during fetal development. The retinal vascular network, which forms out of the optic disk, has been modeled using fractals, and branching patterns have been shown to correlate with disease. A retinal atlas could contain common vessel branching patterns, branch diameters, and information on vessel features such as tortuosity.

The atlas coordinate system defines an intrinsic, anatomically meaningful framework within which anatomic size, shape, color, and other characteristics can be objectively measured and compared. There are three prominent anatomic structures available in the fundus camera images: the optic disk, the macula, and the vessel (or vascular) arch. The optic disk center and macula center provide landmark points, while the vessel arch is a more complicated two-part curved structure that can be concisely described by its central axis.

Choosing either the optic disk center (or macula center) alone to define the atlas coordinate system can allow each image from the population to be translated so the optic disks (maculas) were properly aligned. However, scaling, rotation, and non-linear shape differences would not be normalized across the population.

Choosing both the optic disk center and macula center to establish the atlas coordinate system can allow corrections for translation, scale, and rotational differences across the population. In this case, scale differences could be normalized by measuring the distance from the optic disk center to the macula center. However, non-linear shape variations across the population would still not be corrected.

The upper and lower vessel arches are formed by a paired large vein and artery that exit the optic disk and travel first in the superior and inferior directions, then bend in the temporal direction. The end of the arches can be defined at the first major bifurcation of the arch branch. The arch shape and orientation vary from individual to individual, and greatly influence the structure of the remaining vessel network. Establishing an atlas coordinate system that incorporates the optic disk, macula, and vessel arch can allow for translation, rotation, scaling, and non-linear shape variations to be accommodated across the population.

Figure 11:
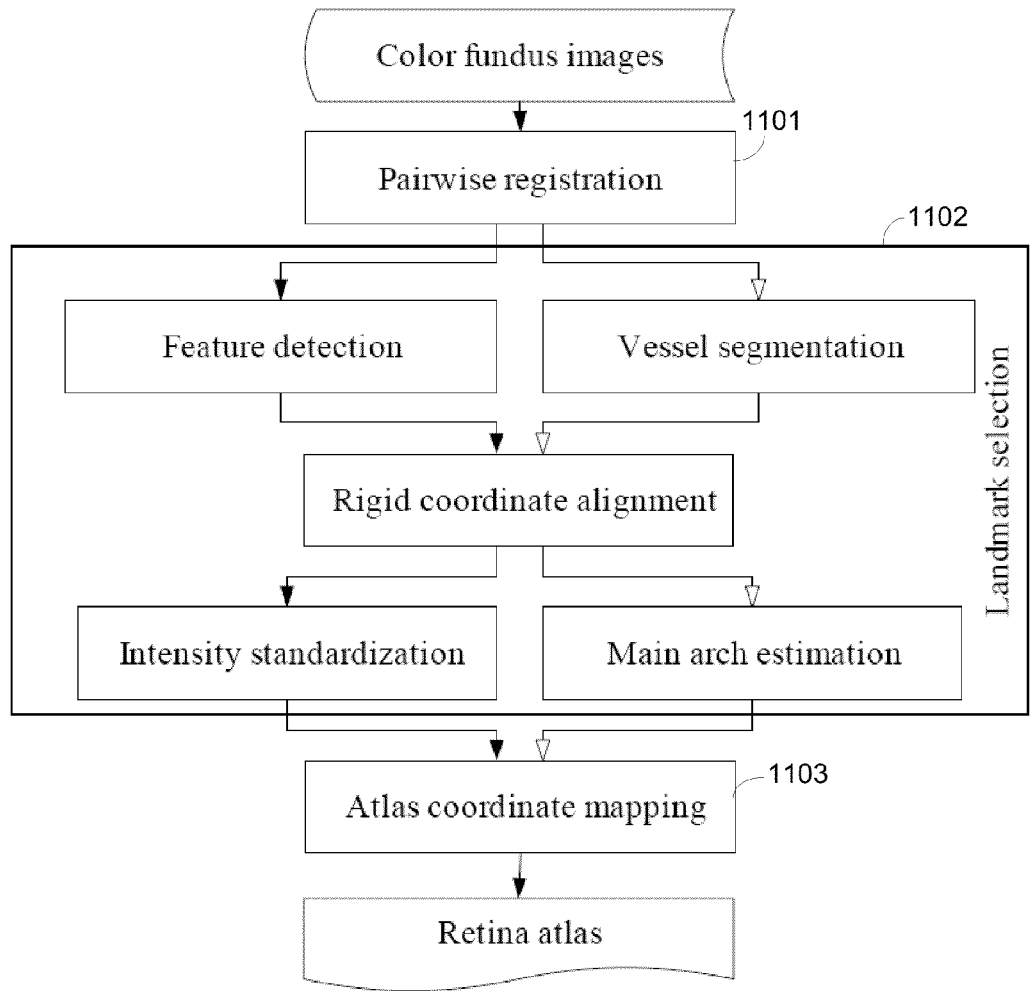
FIG. 11 is a flow diagram for an exemplary method for atlas construction.

In an aspect, for each eye, two images can be acquired: one disk-centered image and one macula-centered image. An atlas construction method is illustrated in FIG. 11. The method can comprise pairwise registration at 1101, feature selection at 1102, and atlas coordinate mapping at 1103. RGB (red, green, blue) fundus color images and a gray-scale intensity and feature representations can be processed separately, but fused together to form the final atlas. Thus, the retinal atlas image output provides both the statistical characteristics of the anatomic features and the color intensity distribution of the fundus images.

Pairwise retinal image registration for atlas generation can serve as a preliminary step for creating an image with an increased anatomic field of view. The registered images can comprise landmarks such as optic disk, macula, fovea, main vessel arch, and the like. Imaging the fundus with an opthalmologic camera allows only a limited field of view due to spherical shape of the eyeball. For comprehensive examination of the retina, it is desired to combine multiple images acquired with different anatomic coverages and obtain a panoramic view of the retina. While the methods disclosed use image pairs to increase the field of view, the methods can be extended to full seven field image mosaics.

Figures 12A, 12B:
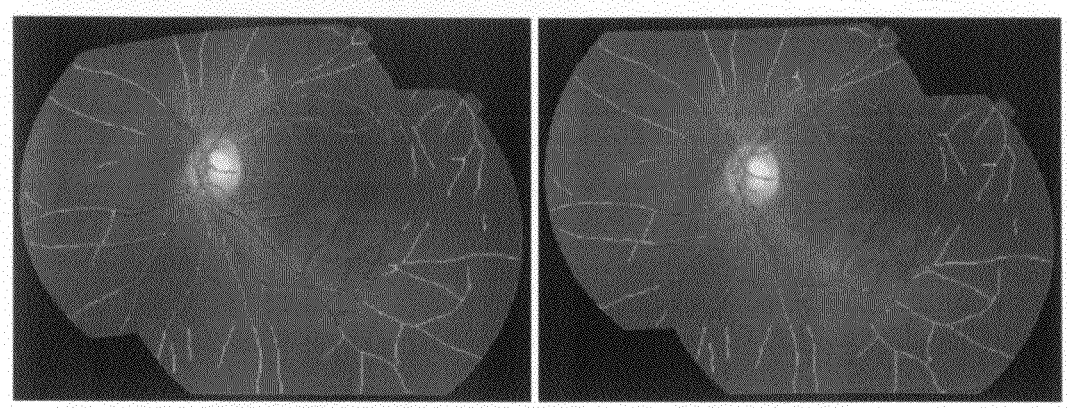
FIG. 12a illustrates registration of a fundus image pair using quadratic model.
FIG. 12b illustrates registration of a fundus image pair using methods provided herein.

The partial-overlap imaging protocol for images limits the application of local or high-order registration algorithms. In addition, uniquely found in retinal image registration, the inherent projective coordinate distortion due to flattening of 3D hemisphere object to 2D image plane can be considered. An isotropic coordinate system for is desirable so test images can refer to the atlas independent of spatial pixel location by a linear one-to-one mapping. The radial-distortion-correction methods provided herein register images in a distortion-free coordinate system by a planar-to-spherical transformation, so the registered image is isotropic under a perfect registration or quasi-isotropic allowing low registration error. As compared in FIG. 12, the fundus curvature appears in the registration result by quadratic model, while the registration utilizing distortion correction methods provided unfolds the curvature to put the registered image in an isotropic coordinate system. FIG. 12 illustrates registration of a fundus image pair using FIG. 12($a$) quadratic model and FIG. 12($b$) methods provided herein. Vessel centerlines are overlaid for visual assessment of registration accuracy. This registration is performed to merge the disk-centered and macula-centered images to provide an increased anatomic field of view. An isotropic atlas makes it independent of spatial location to map correspondences between atlas and test image. In an aspect of the atlas generation methods provided, therefore, the distortion correction methods described herein can be used to obtain a larger field of view that contains anatomic landmarks of retina, and the intensities in overlapping area can be determined by a distance-weighted blending scheme.

The choice of atlas landmarks in retinal images can vary depending on the view of interest, but the atlas can represent most key features in a concise and intuitive way. Considering the clinical utilization, the key features reside where the common pathological features frequently appear and anatomic prominence is deserved. In an aspect, three landmarks can be selected as the retinal atlas key features: the optic disk center (DC) where optic nerves are collected, the macula center (MC) or fovea which is responsible for sharp vision, and the main vessel arch (VA) defined as the largest vein-artery pair. In other aspects, fewer than three or greater than three landmarks can be used.

In an aspect, the atlas landmarks can be detected by automated systems. In another aspect, the atlas landmarks can be detected manually by human experts. The point locations of DC ($p_d$) and MC ($p_f$) can be directly recorded from the registered color fundus images.

In generating a retinal atlas, the vessel structure is a landmark useful for characterizing the retina feature distribution. In particular, the VA can be a prominent paired-running vessel, accordingly, the methods provided can extract the VA by segmenting vessels. The VA can be well detected in most vessel segmentation algorithms known in the art.

Atlas landmarks from training data should be aligned to derive meaningful statistical properties from the atlas. Retinal images in real clinical practice are acquired under diverse fundus camera settings incorporated with saccadic eye movement; focal center, zooming, tilting, etc. Since the projective distortion within an image is corrected during the pairwise registration, the inter-image variations in registered images appear as the difference in rigid coordinate transformation parameters of translation, scale and rotation.

Figure 13A:
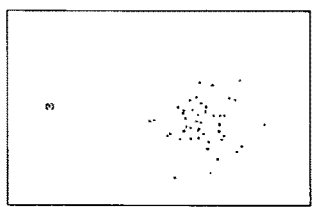
FIG. 13a illustrates how anatomic structures can be aligned with increasing number of degrees of freedom in registration (50 images overlaid with optic disk centers aligned)

For each pair of $p_{d_i}$ and $p_{f_i}$ where i=0, 1, ..., N−1, pinning all $p_{d_i}$s to an arbitrary point ($\mu_d$) clears the translation. Then the centroid of point cloud formed by $p_{f_i}$ can be evaluated to obtain the atlas location of MC ($\mu_f$) so every $p_{f_i}$ can be aligned to $\mu_f$ using the similarity transformation to remove the inter-image variations in scale and rotation. Each step of rigid coordinate alignment for each parameter is illustrated in FIG. 13. FIG. 13 illustrates how anatomic structures can be aligned with increasing number of degrees of freedom in registration. FIG. 13($a$) 50 images overlaid with optic disk centers aligned.

Figure 13B:
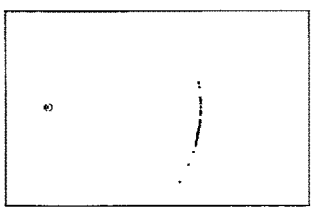
FIG. 13b illustrates how anatomic structures can be aligned with increasing number of degrees of freedom in registration (50 images aligned on optic center and with optic disk to macula distance normalized)
Figure 13C:
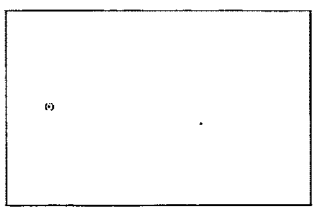
FIG. 13c illustrates how anatomic structures can be aligned with increasing number of degrees of freedom in registration (50 images aligned on optic disk center, with scaling and rotations chosen so that the maculas are aligned)

Macula locations (right side of image) are not aligned. FIG. 13(b) 50 images aligned on optic center and with optic disk to macula distance normalized. FIG. 13(c) 50 images aligned on optic disk center, with scaling and rotations chosen so that the maculas are aligned. Consequently, an aligned pixel position p' from p can be determined by $$p' = s_i R(\theta_i)(p - T_i),$$

where $s_i$, $\theta_i$ and $T_i$ are the difference in scale, rotation and translation measured between point pairs of $(p_{d_i}, p_{f_i})$ and $(\mu_d, \mu_f)$, and the rotation matrix $R(\theta)$ is defined as $[\cos(\theta) \sin(\theta); -\sin(\theta) \cos(\theta)]$.

Ideally, each image used to construct the atlas would contribute to the average with equal weight. However, because fundus camera images suffer inter-image variation in illumination and contrast, it is necessary to adjust the image intensity distribution prior to averaging so that each image is weighted equally in the average.

The intensity distribution of each image up to second moment can be standardized by a statistical normalization process. The sample mean ($\mu_s$) and the standard deviation ($\sigma_s$) can be calculated from the median-masked N images. For each image with $\mu_i$ and $\sigma_i$, the pixel intensity x can be normalized by $$x_n = \sigma_s \left( \frac{x - \mu_i}{\sigma_i} \right) + \mu_s.$$

Figure 14:
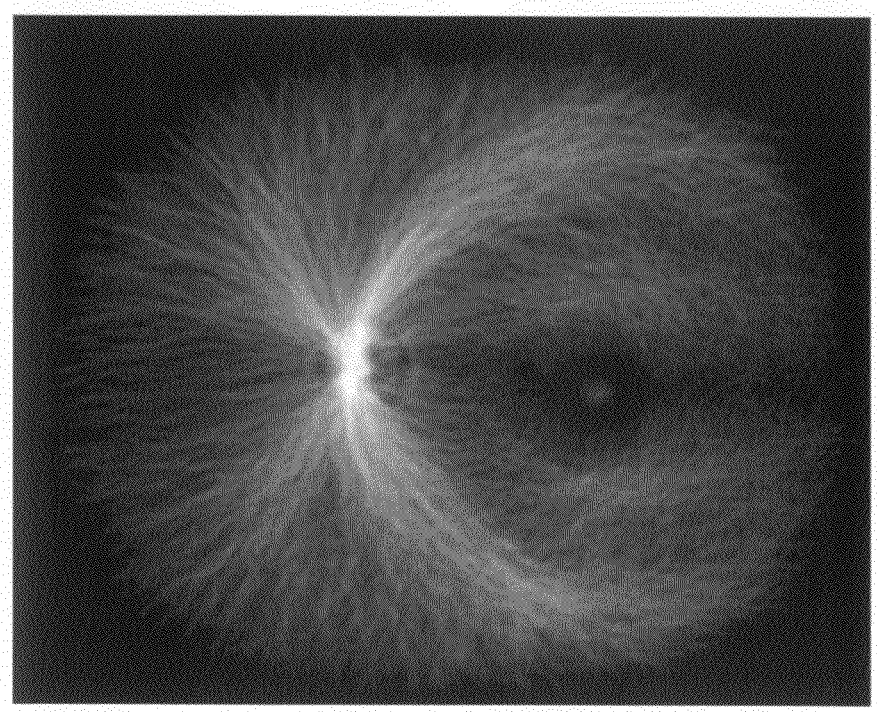
FIG. 14 illustrates average stacked vessel segmentation result following rigid alignment of DC and MC.
Figure 15A:
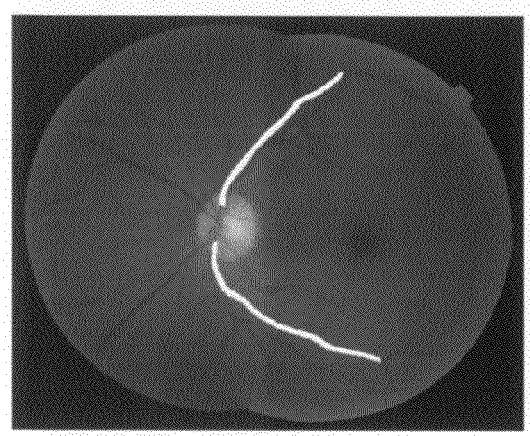
FIG. 15a illustrates main vessel arch segmentation (manual VA segmentation)
Figure 15B:
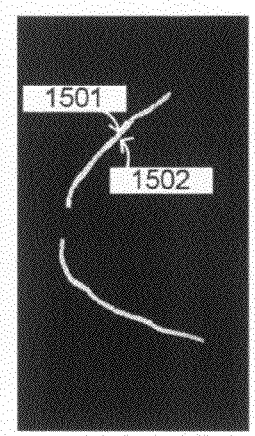
FIG. 15b illustrates main vessel arch segmentation (VA centerline detection by principal curve estimation)
Figure 15C:
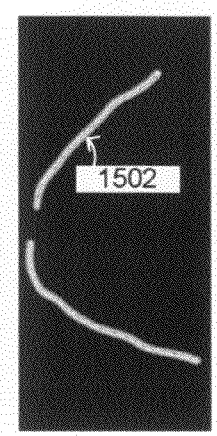
FIG. 15c illustrates main vessel arch segmentation (profile reconstructed VA by inverse distance mapping)

In characterizing the uniqueness of a fundus image, the VA becomes a prominent vessel structure (see FIG. 14). FIG. 14 illustrates average stacked vessel segmentation result following rigid alignment of DC and MC. This image clearly shows the variation in the vessel arch across the population. In the methods provided, an average arch path can be selected for an atlas landmark. The main arch can be clinically defined as the vein and artery pair that runs together. Since the run length of the arch, however, is poorly defined in fundus images, a manual separation of vein consisting of main arch from the vessel segmentation result can be performed (see FIG. 15a)). FIG. 15 illustrates main vessel arch segmentation; FIG. 15(a) manual VA segmentation, FIG. 15(b) VA centerline detection by principal curve estimation, and FIG. 15(c) profile reconstructed VA by inverse distance mapping. In an aspect, the methods provided can define the main arch running as the path from the optic disk until the first large separation of vein and artery.

Since the raw segmentation result shows a crude boundary, local discontinuity or variation in vessel width, the vessel profile can be reconstructed to obtain a smooth VA path. First, the segmentation centerline (thin line 1501 inside thick line 1502 in FIG. 15(b)) can be found by the principal curve estimation as known in the art. However, it is possible to employ any thinning algorithm. An inverse distance map of centerline terminated at the average radius of arch vessel can be generated, so the profile reconstructed VA (thick line 1503 in FIG. 15c)) can be obtained. Finally, the atlas VA can be determined by repeating the principal curve estimation for N profile reconstructed $VA_i$s.

The atlas landmarks can serve as a reference set so each color fundus image can be mapped to the coordinate system defined by the landmarks. As the last step of atlas generation, mapping color fundus images can determine the atlas texture so it becomes possible to retrieve the local and global color properties.

Figure 16A:
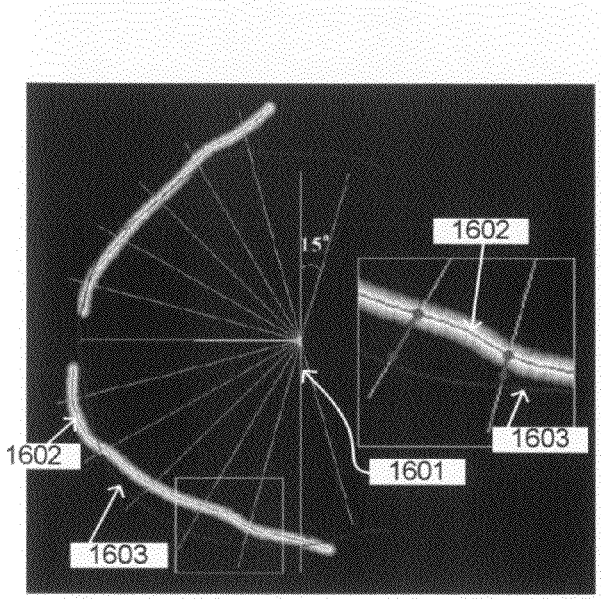
FIG. 16a illustrates atlas coordinate mapping by the TPS (association of control points between atlas VA and $VA_i$ by radial sampling)
Figure 16B:
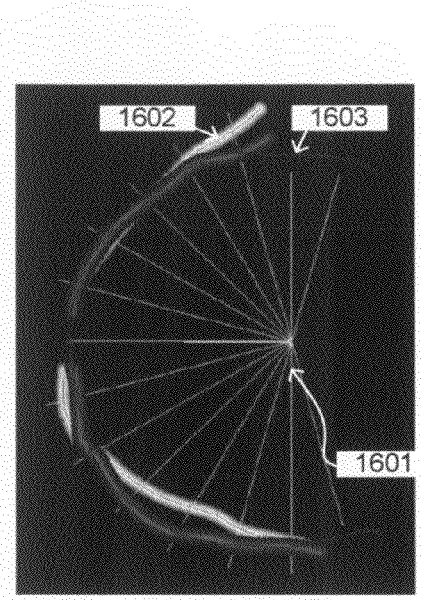
FIG. 16b illustrates atlas coordinate mapping by the TPS (transformation of $VA_i$ to atlas VA)

The thin-plate-spline (TPS), as known in the art, can be used in the methods provided herein for mapping retinal images to the atlas coordinate system. As illustrated in FIG. 16(a), the equiangle sampling centered at $(x_{\mu_d}, y_{\mu_d})$ can be performed to associate control points between atlas VA and $VA_i$. Up to 16 control points can be sampled depending on the length of VA and $VA_i$; 1 at DC, 1 at MC, and 2×7 on VA. By the TPS formulation, the image texture can be mapped to the atlas coordinate system while the control points on $VA_i$ are brought to the corresponding points on VA (see FIG. 16(b) for illustration). FIG. 16 illustrates atlas coordinate mapping by the TPS; FIG. 16(a) association of control points between atlas VA and $VA_i$ by radial sampling, and FIG. 16(b) transformation of $VA_i$ to atlas VA. Green circles (1601) are the aligned DC and MC, and red lines 1602 and blue lines 1603 represent $VA_i$ and atlas VA respectively.

In another aspect, provided are methods for generating a set of simulated retinal images with a known reference standard for registration. In another aspect, provided is a validation process for assessing the quality of any retinal image registration algorithm. The validation method disclosed can be illustrated by taking a pair-wise retinal image registration problem. Mosaicing is an important issue in retinal image registration. But pair-wise registration is an essential step in image mosaicing. The methods disclosed are unique in that the validation is independent of the registration method and the result is objective since accuracy is evaluated in the coordinate system of the individual retinal images, and no human expert intervention is needed.

The methods disclosed can use a large field of view montage image (a "reference standard") obtained by registering multiple high resolution images to a large field of view montage. Since the reference standard image is only used as a texture, the underlying accuracy of the registration algorithm used to create the montage is not important only if the montage contains enough information for specific registration algorithm under validation such as intensity or feature distributions. Therefore, a perfectly accurate registration algorithm is supposed to reproduce the imperfection of montage view perfectly under the validation process. A retinal montage can be used as a reference standard texture so that the features and intensities in the montage resemble those in a real retinal image.

A schematic of the method is provided in FIG. 17. The input montage can be cut in "cookie cutter" fashion to create a set of circular images. Then each cut can be mapped through a series of transformations to incorporate the distortions due to the eye geometry and the image acquisition system, so the coordinate system of the input images to the registration algorithm under evaluation is different from each other. The registration algorithm can modify the individual image coordinate system as needed to produce a registered montage. Once the registration is complete, a transform back through a single known registration and distortion path to the reference standard coordinate system where the quantitative error calculation can be performed.

The method can generate a set of simulated fundus images with a specified amount of overlap between adjacent images. Since the overlapping region is the only information that can be used to guide registration, the performance of various image montage algorithms can be tested by generating test sets with varying amount of overlap. FIG. 18(a) shows the outline of two partially overlapping circular regions with radius r. To simplify the analysis, one image can be centered at the origin, and the other at some location d(0≦d≦r) along the vertical axis. Then the overlap percentage m can be given by $$m = 4\left[\int_0^x \sqrt{r^2-t^2}\, dt - xy\right]\Big/\pi r^2$$
$$= \frac{2r^2\sin^{-1}(x/r)-xd}{\pi r^2}100\ [\%],$$

where $x=\sqrt{r^2-y^2}$, $y=d/2$. For a specific overlap m, a lookup table for d can be used. Once d has been selected, subsequent cut centers can be placed by rotating the point (0, d) by 60°. As shown in FIG. 18(b), each cut can be centered at the edge of an equilateral triangle whose side length is d. Consequently the percent overlap is consistently maintained for any pair of adjacent cuts by controlling parameter d.

During the retinal imaging process, light rays reflected from the retina travel through the lens, the pupil and the cornea and a series of camera lenses, and are then mapped onto the planar image sensor. Considering this optical cascade as a single lens, however, the optical path deformation can be minimized if the camera is well calibrated to compensate for path distortion. Therefore, geometric projection due to the spherical-to-planar (or retina-to-camera space) mapping becomes the most dominant distortion component in the retinal image acquisition system.

Clinical image acquisition proceeds by asking the patient to look in a certain direction, verify the eye is steady, acquire an image, and repeat, so the perturbations in patient position, saccadic eye motion are small enough to ignore. A photographer, however, frequently changes the fundus camera setting in zoom and tilt to get the best images, which causes inconsistent scale and rotation in retinal images taken consecutively. The variation of fundus camera settings can be simulated by introducing random parameters of the affine transform model:

$$X'=A\cdot X$$

where $X=[x\ y]^T$ and $X'=[x'\ y']^T$ denote point coordinates before and after the transform, and A is a 2×2 affine matrix.

Figure 19:
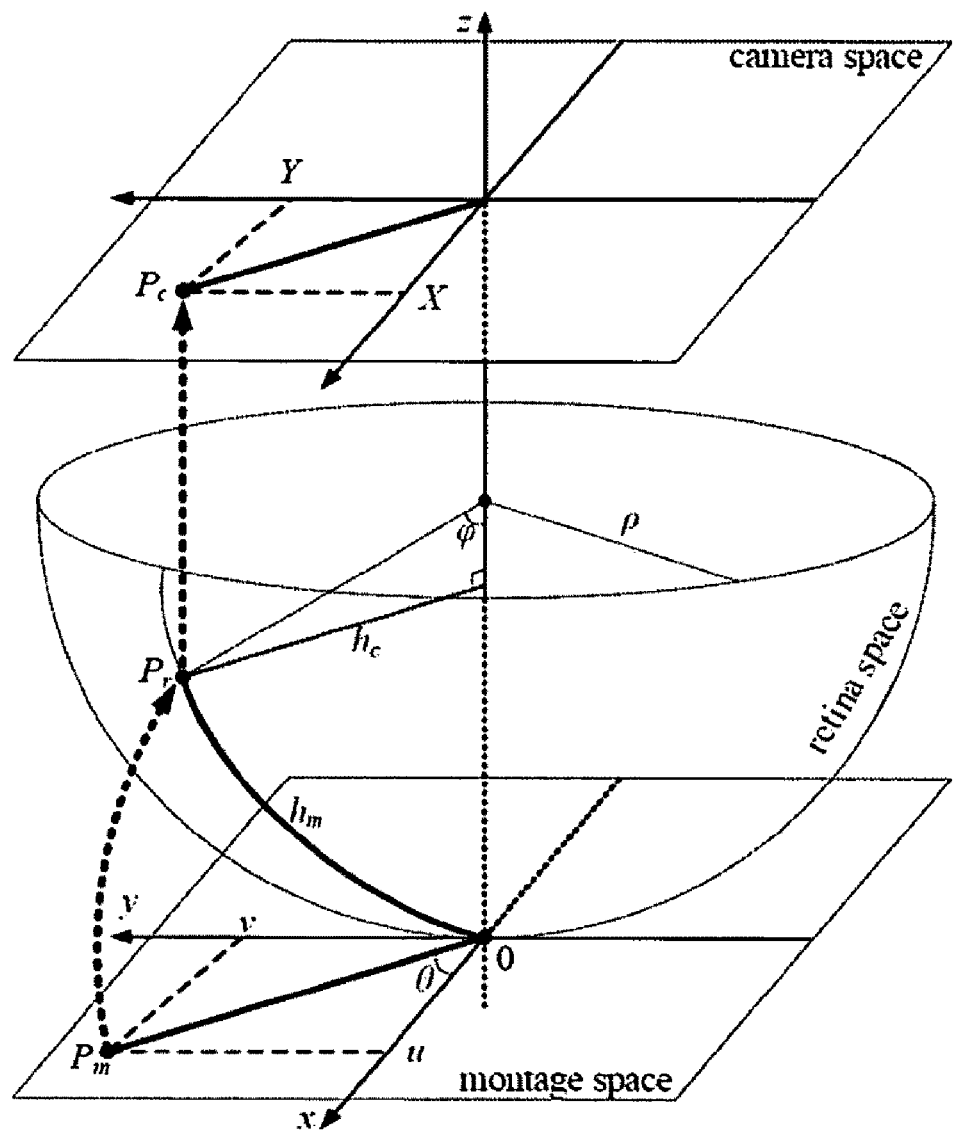
FIG. 19 illustrates how a planar montage image can be mapped onto a sphere (retina space) using an isometric-conformal mapping that preserves angle and radial distances seen from the optical axis.

The image acquisition apparatus in ophthalmology usually limits motion of the patient's head by holding the forehead fixed against a frame, and a camera and/or an eye moves to align a fundus area of interest to the optical axis. The interaction between the fundus camera and the eye can be simplified if the camera rotating around a stationary eye for limited angular range is modeled. Based on this model, a two-step distortion model can be used. As shown in FIG. 19, a planar montage image can first be mapped onto a sphere (retina space) using an isometric-conformal mapping that preserves angle and radial distances seen from the optical axis.

The eyeball has an ovoid shape, however, the clinically interesting fundus regions can be modeled as a sphere without losing much accuracy. Referring to FIG. 19, a point in planar montage space $P_m(u, v)$ is mapped to a point $P_r(x, y, z)$ on a hemisphere that represents the fundus region of the eyeball.

Note the radial distance $\overline{OP_m}$ in montage space is equal to the arc length $\overset{\frown}{OP}$ along the 3D retina space since the planar-to-spherical projection is performed using a distance-preserving transformation. Then $P_r$ in spherical coordinate system can be given by $$x=\rho \sin\phi \cos\theta$$
$$y=\rho \sin\phi \sin\theta$$
$$z=\rho(1-\cos\phi)$$

where $\phi=\sqrt{u^2+v^2}/\rho$, $\theta=\cos^{-1} u/\sqrt{(u^2+v^2)}$, and $\rho$ is the sphere radius. Since the focal length of the fundus camera is long compared to CCD array size, the second distortion step assumes the region for imaging reaches the camera sensor from an orthogonal direction so a parallel projection can be modeled when mapping $P_r$ to a point $P_c(X, Y)$ in camera space. A parallel projection can be achieved by discarding z-component or mathematically by $$\begin{bmatrix} X \\ Y \\ 1 \end{bmatrix} = \begin{bmatrix} 1 & 0 & 0 & 0 \\ 0 & 1 & 0 & 0 \\ 0 & 0 & 0 & 1 \end{bmatrix} \begin{bmatrix} x \\ y \\ z \\ 1 \end{bmatrix}.$$

As a practical consideration, the montage-to-retina space transformation cannot be implemented without forming a discontinuity in the montage, so a mathematical model is provided that directly converts the montage space into camera space. Given the anatomic radius $\rho$ of the eyeball ($\rho \approx 12.5$ mm on average), $P_m$ at distance $h_m$ from the optical axis can be mapped to a point $P_c$ at a distance $h_c$ from the optical axis in camera space with a transformation governed by $$h_c=\rho \sin\phi=\rho \sin(h_m/\rho)$$

Figures 20A, 20B, 20C:
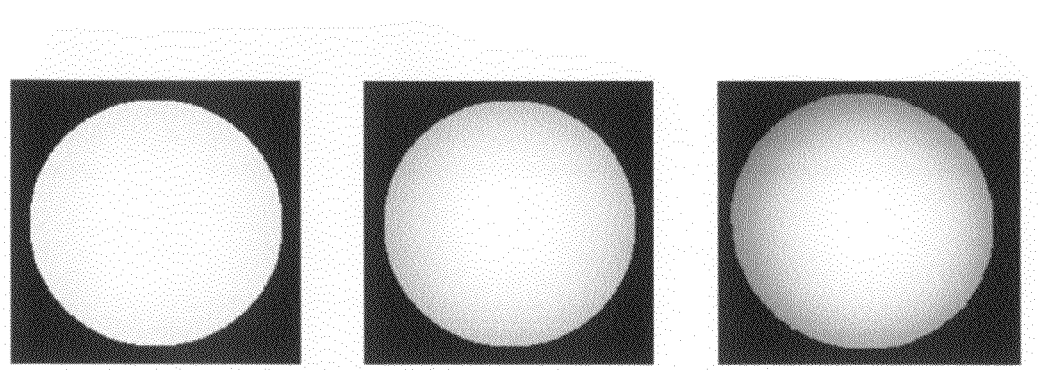
FIG. 20a illustrates a vignetting effect with the vignetting parameter v=0.2.
FIG. 20b illustrates a vignetting effect the vignetting parameter v=0.4.
FIG. 20c illustrates a vignetting effect the vignetting parameter v=0.6.

The distortion model provided can apply a gradual intensity variation to simulate the optical vignetting effect in which the image illumination declines with increasing distance from the camera axis. A vignetting distortion model can be used that follows the cosine-fourth law, $$I_v = \frac{I+1}{v\cos^4\left(\tan^{-1}\left(\frac{r_v}{2\rho}\right)\right)+1-v}$$

where v and $r_v$ serve as design parameters to describe the intensity drop-off and the distance from vignetting center $v_c$ so the pixel intensity I is modified to $I_v$. The vignetting simulation achieves intensity drop pronounced toward the image boundary as demonstrated in FIG. 20, thus potentially reducing feature detectability or intensity correlation in the overlap region. FIG. 20 illustrates a vignetting effect. Varying the vignetting parameter v changes the amount intensity dropoff. Figures show intensity drop when FIG. 20(a) v=0.2, FIG. 20(b) v=0.4, and FIG. 20(c) v=0.6; images are enhanced in contrast.

The vignetting effect can be governed by two parameters; v and $v_c$. The parameters can be estimated by investigating real fundus images to measure the vignetting effect. After extracting the background component to estimate the illumination of 40 images in the a reference database, the vignetting center was determined at the maximum response of the average illumination; $v_c$=42.7±9.1% of radius from the image center. The average line profile drawn from $v_c$ to the boundary is then fit to the vignetting equation $$I_v = \frac{I+1}{v\cos^4\left(\tan^{-1}\left(\frac{r_v}{2\rho}\right)\right) + 1 - v}$$

to yield $v=0.40\pm0.11$. Consequently, vignetting parameters of each simulated retinal image are randomly distributed according to $N(\mu_{v_c}, \sigma_{v_c}^2)$ and $N(\mu_v, \sigma_v^2)$ respectively, where $N(\mu,\sigma^2)$ represents the Gaussian distribution with mean of $\mu$ and standard deviation of $\sigma$.

Provided are methods for validation of retinal image registration using the retinal images generated. Given the simulated retinal image set obtained from the reference standard using known transformation parameters, any retinal image registration method can be applied to align the images. The image registration is a process of searching for a set of coordinate transformation functions that map each of the individual frames into a common aligned coordinate system.

Figure 21:
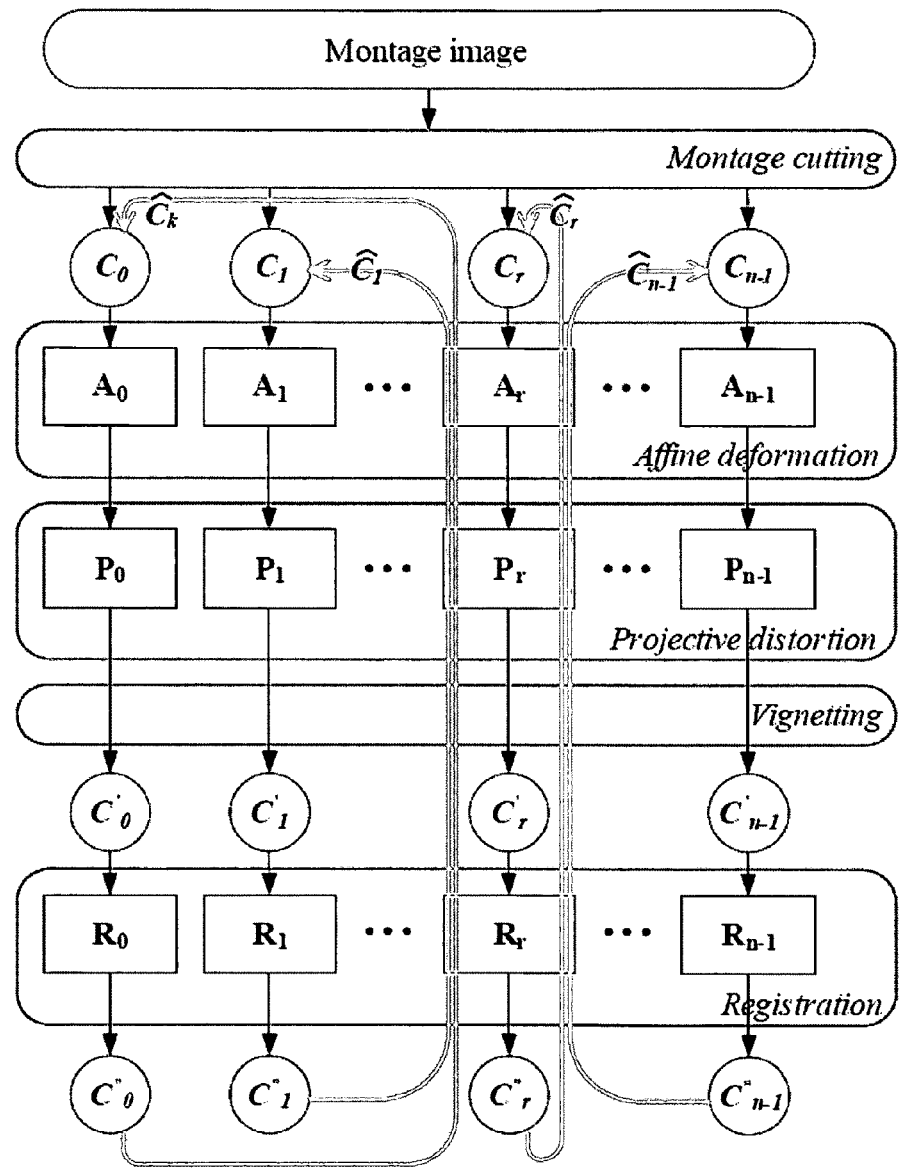
FIG. 21 illustrates the coordinate system restoration path when n cuts are made the montage image producing images $C_0, C_1, \ldots C_{n-1}$.
Figure 22A:
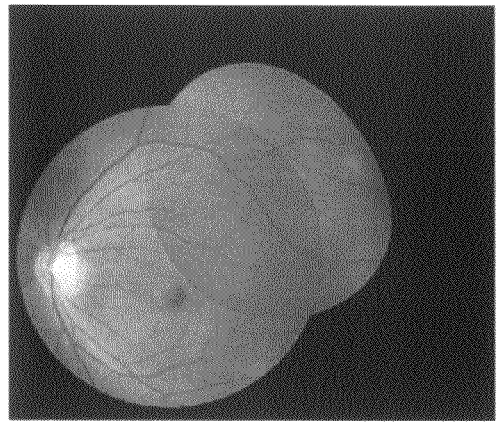
FIG. 22a illustrates coordinate warping in a non-overlapping region, the right image is registered to the left using Speeded Up Robust Features method.
Figure 22B:
FIG. 22b illustrates coordinate warping in a non-overlapping region, the right image is registered to the left using affine transform model.
Figure 22C:
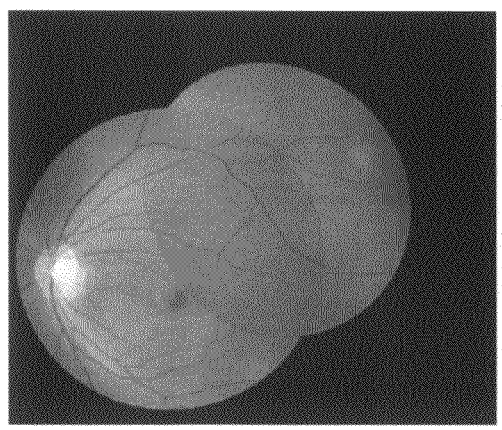
FIG. 22c illustrates coordinate warping in a non-overlapping region, the right image is registered to the left using generalized dual bootstrap-ICP method.
Figure 22D:
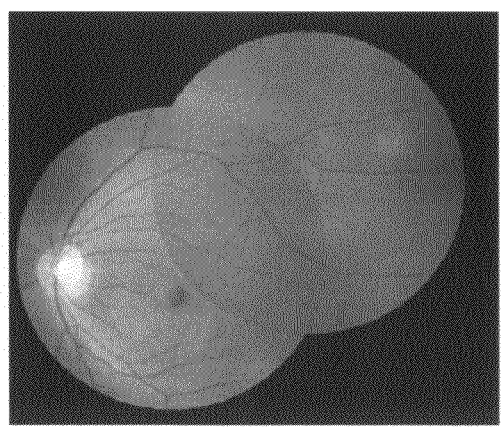
FIG. 22d illustrates coordinate warping in a non-overlapping region, the right image is registered to the left using radial distortion correction model provided herein.

The methods provided can evaluate how accurately each image is transformed to fit the common coordinate system. Starting from the registration results, the validation process restores the montage coordinate system and compares the results to the known reference standard to assess accuracy. FIG. 21 describes the coordinate system restoration path when n cuts are made the montage image producing images $C_0, C_1, \ldots, C_{n-1}$. The coordinate system of each cut is transformed independently along the downward distortion path to generate $C'_0, C'_1, \ldots, C'_{n-1}$ for the inputs of the registration algorithm under evaluation.

Many image registration algorithms choose one of the images as a "reference" image, and transform the remaining images so that they are best aligned with the reference. Without loss of generality, assume that $C'_r$ is selected as the registration reference image. Then, the registration results ($C''_0, C''_1, \ldots, C''_{n-1}$) are aligned into a common coordinate system of $C''_r$. The registered images can also be aligned in the original montage space if they are transformed back through the registration and distortion functions along the same path. Since the registration transformation function for the reference image ($R_r$) is usually the identity transformation, the reverse registration is also the identity transformation. This reasoning can be expressed mathematically by $$\hat{C}_i = A_r^{-1} P_r^{-1} R_r^{-1} (C''_i)$$
$$= A_r^{-1} P_r^{-1} R_r^{-1} R_i P_i A_i (C_i)$$

where $\hat{C}_i$ is the image in the restored coordinate system $i=0, 1, n-1$ and the transformations are defined as in FIG. 21. If the registration is perfect, ignoring the intensity mismatch due to vignetting, $\hat{C}_i$ is equal to $C_i$ and the series of transformations is the identity transformation. In FIG. 21 the coordinate restoration path is denoted by gray arrow line for each image and $C'_r$ is considered as the registration reference image; no transform matrix is given to the vignetting process since it is only for intensity change.

A large variety of transform models and error metrics exist in retinal image registration. The methods provided, however, work if the registration algorithm can provide an inverse transform of registration reference ($R_r^{-1}$ in the example provided) and a forward transform of registration target ($R_0$, $R_1 \ldots R_{n-1}$ in the example), and then the objective evaluation of accuracy becomes possible by tracking a point set of interest called validation points. In practice, the coordinate distortion function by spherical-to-planar projection $P_i$ is the same for all images. Assuming is the reference image and $R_r=I$, then a coordinate transform by registration can be described more concisely as $$R_i = R_r P_r A_r A_i^{-1} P_i^{-1}$$
$$= P_r A_r A_i^{-1} P_i^{-1}.$$

Therefore, the accuracy of a registration algorithm can be determined by the degree of how closely the algorithm can estimate and undo the coordinate deformations of reference image including the affine and the projective distortions.

A concern when validating a registration algorithm is to present an objective error measure. Conventionally a manual registration result is used as ground truth and is compared to the computer-based registration results. The process, however, has the disadvantage that manual registration is time-consuming and subjective. Further, a satisfactory manual registration in the overlapping regions may still not generate a correct result in the non-overlapping regions.

An example of pair-wise registration using a quadratic model is shown in FIG. 22. In this example, the two images are registered almost seamlessly in the overlapping regions leaving almost no evidence of misalignment. Small registration errors in the overlapping region, however, are amplified and result in excessive coordinate warping in the non-overlapping regions. FIG. 22 provides examples of coordinate warping in non-overlapping region. The right image is registered to the left using FIG. 22(a) Speeded Up Robust Features (SURF) method, FIG. 22(b) affine transform model, FIG. 22(c) generalized dual bootstrap-ICP method (quadratic model), and FIG. 22(d) radial distortion correction model provided herein. Since all the methods are designed to minimize the target registration error over the overlapping region, the uniqueness of each approach results in diverse coordinate warping in non-overlapping region where no registration constraint exists. Note two images are acquired to have the same dimension.

To assess the performance of a registration algorithm, any set of validation points can be tracked from the original montage, through the cutting and distortion process, through the image registration, and then back through the reverse transforms into the original montage coordinate system. The distance between the original validation points and their transformed position after registration and mapping through the inverse transformations can be used as a registration quality figure of merit.

Figure 23:
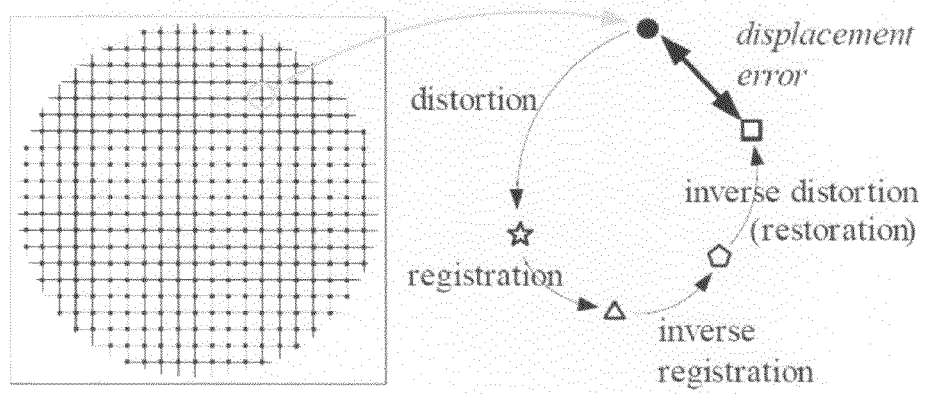
FIG. 23 illustrates how validation points can be tracked throughout a process using validation landmarks which are at the intersection of virtual grid lines in the original montage space.

The methods provided can use validation landmarks which are at the intersection of virtual grid lines in the original montage space (see FIG. 23). FIG. 23 illustrates how validation points can be tracked throughout the entire process. Validation points are the intersections of grid lines shown on the left. A single validation point (solid circle on top right) is distorted by the geometric transformations used to create the simulated images (point is now represented as the star symbol). A registration algorithm aligns the individual images, moving the validation point (now represented by a triangle). During performance assessment, the inverse registration for the reference image is applied (transforming the triangle into the pentagon) and then the inverse geometric transformation is applied (transforming the pentagon to the square). The distance between the square and the circle can be measured in the original montage space to assess registration error. The locations of validation points can be modified by a specific transformation of each step, and the registration accuracy can be assessed by calculating the point displacement vector from the initial position to the restored position. Consequently a displacement error measurement (DEM) can be used as the registration error metric:

$$DEM = \frac{1}{K}\sum_{k=0}^{K-1} \|v_k(x, y) - \hat{v}_k(x - \mu_x, y - \mu_y)\|,$$

and $$(\mu_x, \mu_y) = \frac{1}{K}\sum_{k=0}^{K-1} (x_k - \hat{x}_k, y_k - \hat{y}_k),$$

where K is the number of validation points, and v(x, y) and $\hat{v}(\hat{x}, \hat{y})$ are the validation points in montage and restored coordinate respectively. In $$DEM = \frac{1}{K}\sum_{k=0}^{K-1} \|v_k(x, y) - \hat{v}_k(x - \mu_x, y - \mu_y)\|,$$

the mean displacements between initial and restored validation points denoted by $(\mu_x, \mu_y)$ can be optionally subtracted so the registration error can be evaluated either for geometric distortion component by ignoring the mean displacement or the comprehensive accuracy quantitatively. The error measurement disclosed is not only independent of the particular registration algorithm but capable of assessing the accuracy for the non-overlapping region. By evaluating the DEM for different registration algorithms, a direct and truly objective comparison becomes possible.

Figure 24:
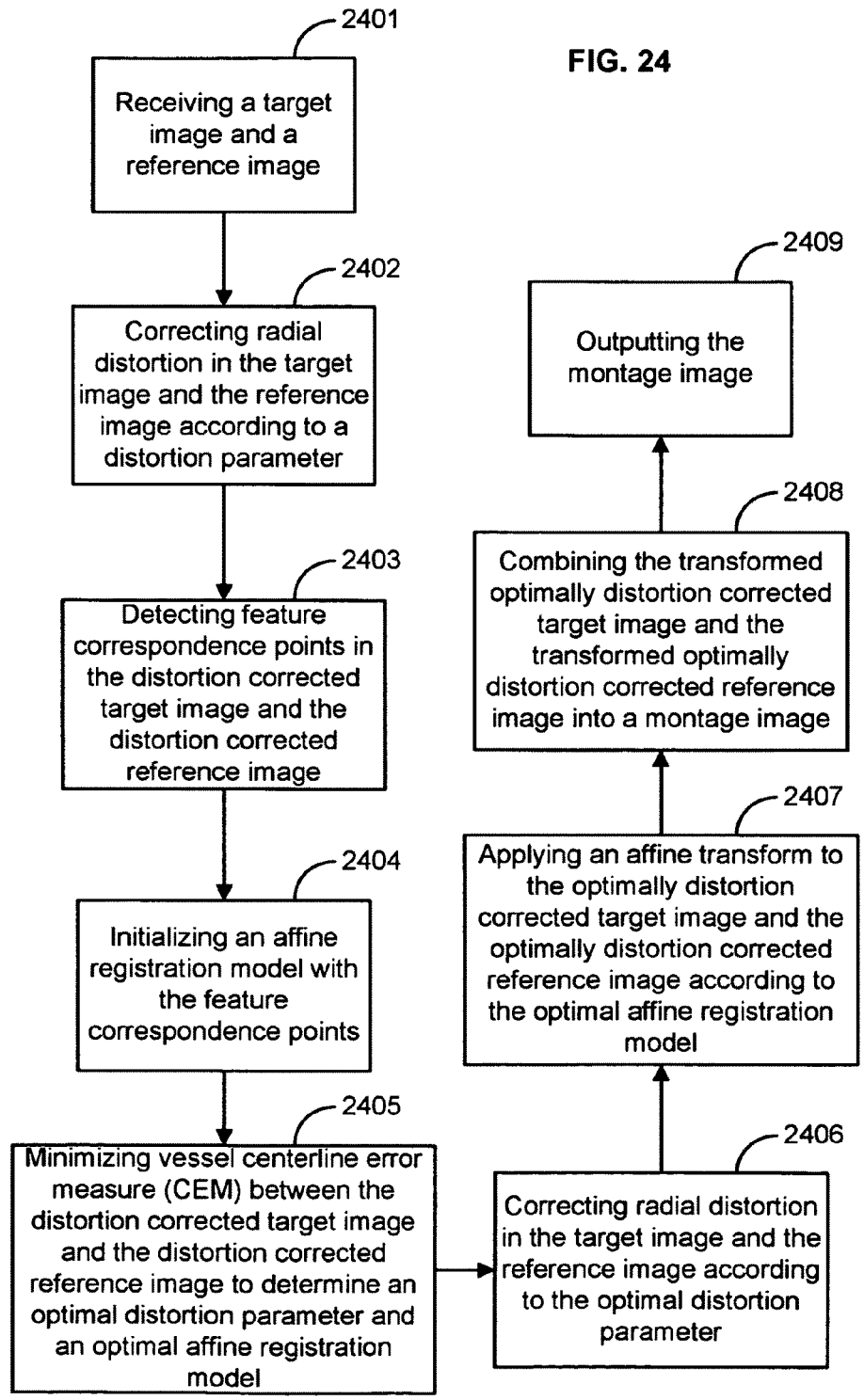
FIG. 24 is a flow diagram for a method for image distortion correction.

In an aspect, illustrated in FIG. 24, provided are methods for image distortion correction, comprising receiving a target image and a reference image at 2401, correcting radial distortion in the target image and the reference image according to a distortion parameter at 2402, detecting feature correspondence points in the distortion corrected target image and the distortion corrected reference image at 2403, initializing an affine registration model With the feature correspondence points at 2404, minimizing vessel centerline error measure (CEM) between the distortion corrected target image and the distortion corrected reference image to determine an optimal distortion parameter and an optimal affine registration model at 2405, correcting radial distortion in the target image and the reference image according to the optimal distortion parameter at 2406, applying an affine transform to the optimally distortion corrected target image and the optimally distortion corrected reference image according to the optimal affine registration model at 2407, combining the transformed optimally distortion corrected target image and the transformed optimally distortion corrected reference image into a montage image at 2408, and outputting the montage image at 2409.

The target image and the reference image can be retinal images. Feature correspondence points can comprise measurements derived from vessel lines, vessel line branch points, and vessel crossings.

Detecting feature correspondence points in the distortion corrected target image and the distortion corrected reference image can further comprise for each feature correspondence point, determining a spatial and vector space correlation and determining two feature correspondence points having the highest spatial and vector space correlation.

Correcting radial distortion can further comprise determining a point u on the target image, transforming point u as a function of position off of an optical axis to determine a distorted point v, and correcting for distortion by estimating $\hat{v}$ from u using $$\hat{v} = u \cdot \left(1 + \sum_{n=1}^{\infty} k_n r^{2n}\right),$$

wherein $k_n$ is the distortion parameter and r is the distance from an optical axis center to u. $k_n$ can be determined by a bisection search over an interval that is determined from properties of an imaged object and an image acquisition system.

An optimal affine registration model for $k_n$ can be determined by a minimization method to find minimum vessel centerline error measure (CEM) between the target image and the reference image.

$$CEM = \frac{1}{N}\sum_{n=0}^{N-1} |v_n^{(r)} - \hat{v}| = \frac{1}{N}\sum_{n=0}^{N-1} |v_n^{(r)} - v_n^{(t)} M|,$$

wherein N is a vessel line length and $v^{(r)}$ is a closest point in the reference image after transforming a point $v^{(t)}$ in the target image.

If two pixels overlap in the montage image creating an overlap pixel, then determine an intensity of the overlap pixel by a distance weighted blending scheme.

Figure 25:
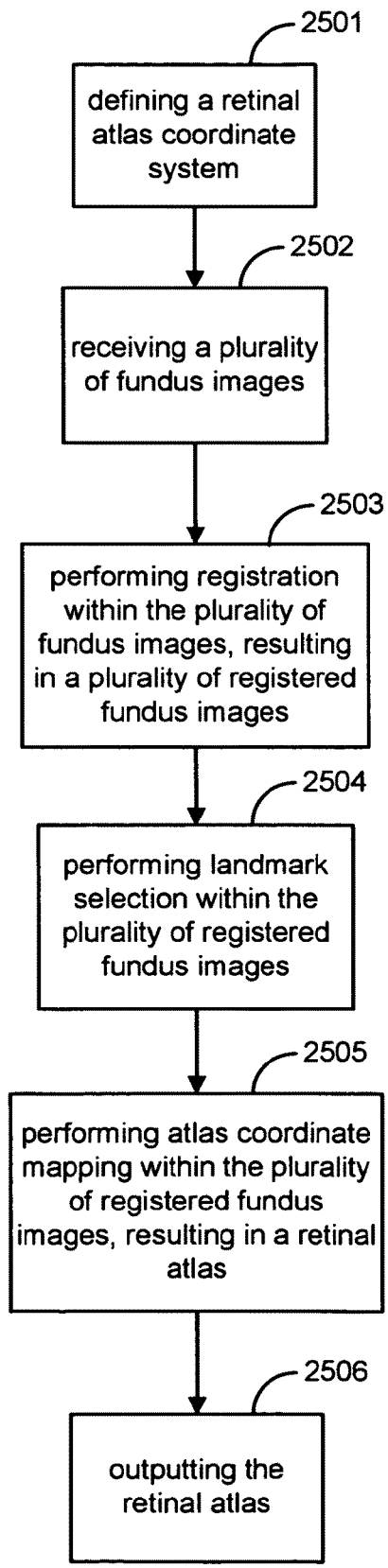
FIG. 25 is a flow diagram for a method for generating a retinal atlas.

In another aspect, illustrated in FIG. 25, provided are methods for generating a retinal atlas, comprising defining a retinal atlas coordinate system at 2501, receiving a plurality of fundus images at 2502, performing registration within the plurality of fundus images, resulting in a plurality of registered fundus images at 2503, performing landmark selection within the plurality of registered fundus images at 2504, performing atlas coordinate mapping within the plurality of registered fundus images, resulting in a retinal atlas at 2505, and outputting the retinal atlas at 2506.

The retinal atlas coordinate system can be defined by an optic disk center (DC), a macula center (MC), and a main vessel arch (VA).

Performing registration can comprise receiving a target image and a reference image, correcting radial distortion in the target image and the reference image according to a distortion parameter, detecting feature correspondence points in the distortion corrected target image and the distortion corrected reference image, initializing an affine registration model with the feature correspondence points, minimizing vessel centerline error measure (CEM) between the distortion corrected target image and the distortion corrected reference image to determine an optimal distortion parameter and an optimal affine registration model, correcting radial distortion in the target image and the reference image according to the optimal distortion parameter, applying an affine transform to the optimally distortion corrected target image and the optimally distortion corrected reference image according to the optimal affine registration model, combining the transformed optimally distortion corrected target image and the transformed optimally distortion corrected reference image into a montage image, and outputting the montage image.

Performing landmark selection can comprise performing feature detection, performing vessel segmentation, performing rigid coordinate alignment, performing intensity standardization, and performing main arch estimation.

Feature detection can comprise detecting at least one of a point location of an optic disk center ($p_d$) and a point location of a macula center ($p_f$). Performing vessel segmentation can comprise detecting a main vessel arterial arch. Performing vessel segmentation can comprise detecting a main vessel venous arch. Performing vessel segmentation can comprise detecting a centerline of a main neurovascular bundle.

Performing rigid coordinate alignment can comprise pinning each ($p_d$) to an arbitrary point ($\mu_d$) and evaluating a centroid of a point cloud formed by all ($p_f$)s to determine an atlas location of MC($\mu_f$) and aligning each ($p_f$) to $\mu_f$.

Performing intensity standardization can comprise normalizing an intensity distribution of each of the plurality of fundus images.

Performing main arch estimation can comprise determining a segmentation centerline according to a thinning algorithm, generating an inverse distance map of the segmentation centerline, resulting in a profile reconstructed VA, and repeating the thinning algorithm for the profile reconstructed VA.

Performing atlas coordinate mapping comprises mapping the plurality of registered fundus images to the atlas coordinate system according to the landmark selection.

In another aspect, provided is a retinal atlas, comprising an atlas coordinate system and a plurality of registered pairs of fundus images mapped to the atlas coordinate system, wherein mapping the plurality of registered pairs of fundus images comprises performing landmark selection within the plurality of registered pairs of fundus images, and mapping the plurality of registered pairs of fundus images to the atlas coordinate system according to the landmark selection.

In another aspect, provided is a computer readable medium having computer executable instructions embodied thereon for image distortion correction, comprising receiving a target image and a reference image, correcting radial distortion in the target image and the reference image according to a distortion parameter, detecting feature correspondence points in the distortion corrected target image and the distortion corrected reference image, initializing an affine registration model with the feature correspondence points, minimizing vessel centerline error measure (CEM) between the distortion corrected target image and the distortion corrected reference image to determine an optimal distortion parameter and an optimal affine registration model, correcting radial distortion in the target image and the reference image according to the optimal distortion parameter, applying an affine transform to the optimally distortion corrected target image and the optimally distortion corrected reference image according to the optimal affine registration model, combining the transformed optimally distortion corrected target image and the transformed optimally distortion corrected reference image into a montage image, and outputting the montage image.

In another aspect, provided is a computer readable medium for generating a retinal atlas, comprising defining a retinal atlas coordinate system, receiving a plurality of fundus images, performing registration within the plurality of fundus images, resulting in a plurality of registered fundus images, performing landmark selection within the plurality of registered fundus images, performing atlas coordinate mapping within the plurality of registered fundus images, resulting in a retinal atlas, and outputting the retinal atlas.

In another aspect, provided is a system for image distortion correction, comprising, a memory, configured for storing image data and a processor, coupled to the memory, configured for receiving a target image and a reference image, correcting radial distortion in the target image and the reference image according to a distortion parameter, detecting feature correspondence points in the distortion corrected target image and the distortion corrected reference image, initializing an affine registration model with the feature correspondence points, minimizing vessel centerline error measure (CEM) between the distortion corrected target image and the distortion corrected reference image to determine an optimal distortion parameter and an optimal affine registration model, correcting radial distortion in the target image and the reference image according to the optimal distortion parameter, applying an affine transform to the optimally distortion corrected target image and the optimally distortion corrected reference image according to the optimal affine registration model, combining the transformed optimally distortion corrected target image and the transformed optimally distortion corrected reference image into a montage image, and outputting the montage image.

In another aspect, provided is a system for generating a retinal atlas, comprising a memory, configured for storing image data and a processor, coupled to the memory, configured for defining a retinal atlas coordinate system, receiving a plurality of fundus images, performing registration within the plurality of fundus images, resulting in a plurality of registered fundus images, performing landmark selection within the plurality of registered fundus images, performing atlas coordinate mapping within the plurality of registered fundus images, resulting in a retinal atlas, and outputting the retinal atlas.

Figure 26:
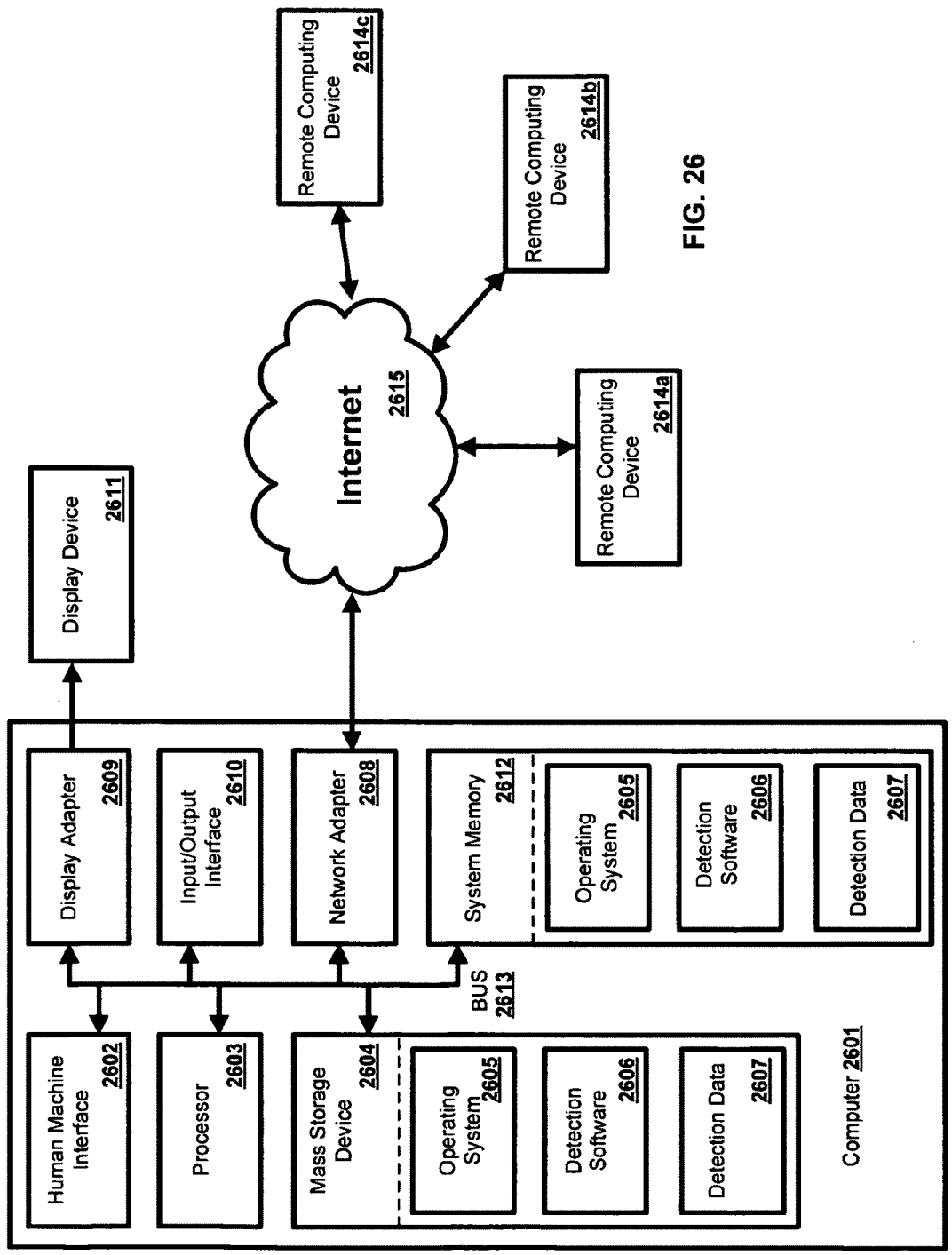
FIG. 26 is a block diagram illustrating an exemplary operating environment for performing the disclosed methods.

FIG. 26 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 2601. The components of the computer 2601 can comprise, but are not limited to, one or more processors or processing units 2603, a system memory 2612, and a system bus 2613 that couples various system components including the processor 2603 to the system memory 2612. In the case of multiple processing units 2603, the system can utilize parallel computing.

The system bus 2613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 2613, and all buses specified in this description can also be implemented over a wired or wireless network connection and each of the subsystems, including the processor 2603, a mass storage device 2604, an operating system 2605, image processing software 2606, image data 2607, a network adapter 2608, system memory 2612, an Input/Output Interface 2610, a display adapter 2609, a display device 2611, and a human machine interface 2602, can be contained within one or more remote computing devices 2614a,b,c at physically separate locations, connected through buses of this form, in effect implementing a fully distributed system.

The computer 2601 typically comprises a variety of computer readable media. Exemplary readable media can be any available media that is accessible by the computer 2601 and comprises, for example and not meant to be limiting, both volatile and non-volatile media, removable and non-removable media. The system memory 2612 comprises computer readable media in the form of volatile memory, such as random access memory (RAM), and/or non-volatile memory, such as read only memory (ROM). The system memory 2612 typically contains data such as image data 2607 and/or program modules such as operating system 2605 and image processing software 2606 that are immediately accessible to and/or are presently operated on by the processing unit 2603.

In another aspect, the computer 2601 can also comprise other removable/non-removable, volatile/non-volatile computer storage media. By way of example, FIG. 26 illustrates a mass storage device 2604 which can provide non-volatile storage of computer code, computer readable instructions, data structures, program modules, and other data for the computer 2601. For example and not meant to be limiting, a mass storage device 2604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2604, including by way of example, an operating system 2605 and image processing software 2606. Each of the operating system 2605 and image processing software 2606 (or some combination thereof) can comprise elements of the programming and the image processing software 2606. Image data 2607 can also be stored on the mass storage device 2604. Image data 2607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 2601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 2603 via a human machine interface 2602 that is coupled to the system bus 2613, but can be connected by other interface and bus structures, such as a parallel port, game port, an IEEE 1394 Port (also known as a Firewire port), a serial port, or a universal serial bus (USB).

In yet another aspect, a display device 2611 can also be connected to the system bus 2613 via an interface, such as a display adapter 2609. It is contemplated that the computer 2601 can have more than one display adapter 2609 and the computer 2601 can have more than one display device 2611. For example, a display device can be a monitor, an LCD (Liquid Crystal Display), or a projector. In addition to the display device 2611, other output peripheral devices can comprise components such as speakers (not shown) and a printer (not shown) which can be connected to the computer 2601 via Input/Output Interface 2610. Any step and/or result of the methods can be output in any form to an output device. Such output can be any form of visual representation, including, but not limited to, textual, graphical, animation, audio, tactile, and the like.

The computer 2601 can operate in a networked environment using logical connections to one or more remote computing devices 2614a,b,c. By way of example, a remote computing device can be a personal computer, portable computer, a server, a router, a network computer, a peer device or other common network node, and so on. Logical connections between the computer 2601 and a remote computing device 2614a,b,c can be made via a local area network (LAN) and a general wide area network (WAN). Such network connections can be through a network adapter 2608. A network adapter 2608 can be implemented in both wired and wireless environments. Such networking environments are conventional and commonplace in offices, enterprise-wide computer networks, intranets, and the Internet 2615.

For purposes of illustration, application programs and other executable program components such as the operating system 2605 are illustrated herein as discrete blocks, although it is recognized that such programs and components reside at various times in different storage components of the computing device 2601, and are executed by the data processor(s) of the computer. An implementation of image processing software 2606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD)

or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

In one embodiment, the methods were performed using 20 pairs of images taken of three subjects using a Canon 60 color fundus camera (Canon, Tokyo, Japan). Images for one subject were acquired using a 30° FOV and with a 60° FOV for the other two subjects. The camera produced a three-channel RGB color image, but only the green channel was used for these experiments since the green channel has the highest information content and best contrast for the retinal vessels. The 8-bit green channel images were resized from 2392× 2048 to 598×512 pixels. The percentage overlap between image pairs varied from 12.8% to 59.5%.

The grid line spacing for seed detection was set to 10 pixels, and the scale factor σ for the Hessian operator was set to 2.0 pixels. The vessel tracing continued as long as the eigenvalue difference was less than the scale parameter and eigenvector angle change was no more than 900. The search range for the optimal radial distortion coefficient k was [−0.2, +0.2].

Figure 27A:
FIG. 27a is the registration result of an image pair from 30° FOV camera with 28.9% overlap (similarity transform)
Figure 27B:
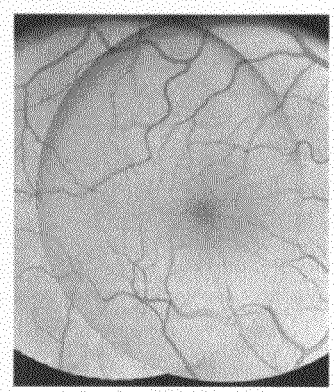
FIG. 27b is the registration result of an image pair from 30° FOV camera with 28.9% overlap (affine transformation)
Figure 27C:
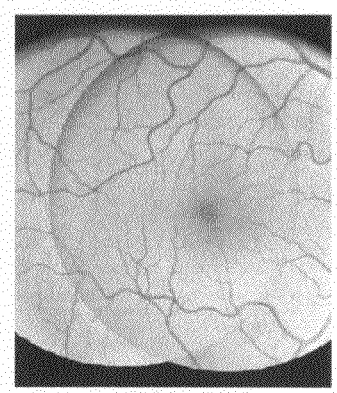
FIG. 27c is the registration result of an image pair from 30° FOV camera with 28.9% overlap (non-linear barrel distortion (k<0) is corrected and then registration is performed with the affine model)

FIG. 27 is the registration result of an image pair from 30° FOV camera with 28.9% overlap. Visual inspection reveals that the neither the similarity transform (FIG. 27(a)) nor the affine transformation (FIG. 27(b)) is able to register the image pairs without obvious vessel mismatches. If the non-linear barrel distortion (k<0) is corrected and then registration is performed with the affine model (FIG. 27(c)), most of the ghost vessels are eliminated.

Figures 28A, 28B, 28C:
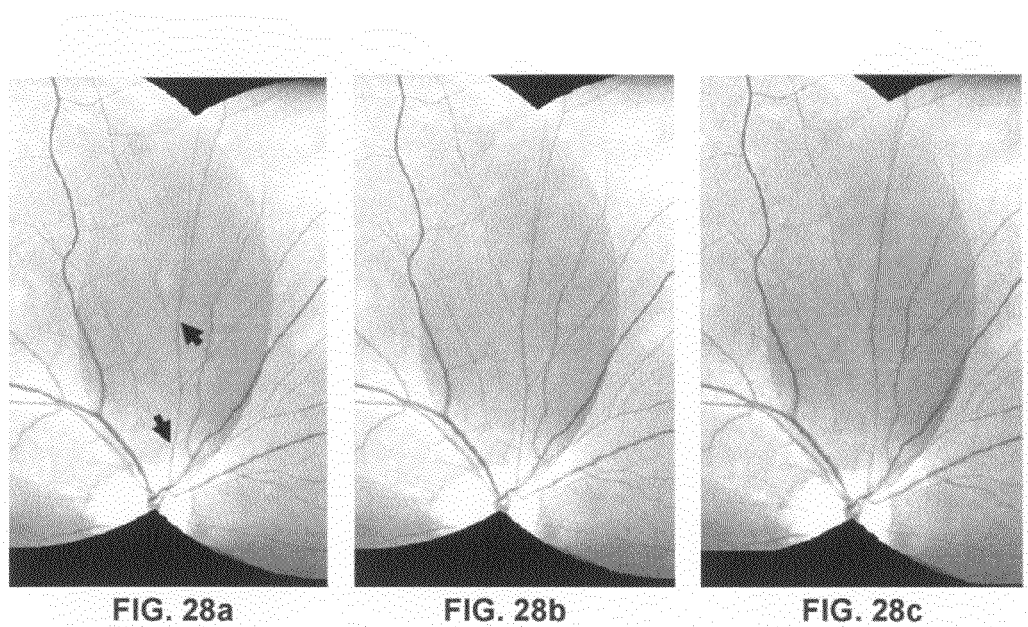
FIG. 28a is the registration result of an image pair from 60° FOV camera with 27.6% overlap (similarity transform)
FIG. 28b is the registration result of an image pair from 60° FOV camera with 27.6% overlap (affine transformation)
FIG. 28c is the registration result of an image pair from 60° FOV camera with 27.6% overlap (radial distortion corrected and the affine registration applied)

For the 60° FOV camera, the pincushion distortion from the lens optics was more dominant than the barrel distortion caused by retina curvature. The image pair shown in FIG. 28 is from the 60° FOV camera and has 27.6% overlap. The similarity and affine transform registrations (FIG. 28(a-b)) show obvious vessel misalignment, especially in the top right corner of the image. If the radial distortion is corrected and the affine registration applied, the vessel mismatch is greatly, but not completely, reduced (FIG. 28(c)).

The overall registration accuracy as measured by CEM is given in Table 1. Based on the CEM, the methods provided can register retinal image pairs with 17% higher accuracy than the affine-only approach. Execution time required to match a single image pair using the affine model and distortion correction was about two minutes on a Pentium IV 2.0 GHz PC, but the actual runtime depends on the vessel line lengths and the percent overlap between images.

TABLE 1

Mean ± standard deviation of vessel line error in pixels across 20 image pairs.

| | Similarity transform | Affine transform | Methods Disclosed |
|---|---|---|---|
| Subject I | 3.03 ± 0.63 | 2.39 ± 0.38 | 1.58 ± 0.13 |
| Subject II | 2.71 ± 0.66 | 1.97 ± 0.32 | 1.87 ± 0.37 |
| Subject III | 2.63 ± 0.21 | 2.28 ± 0.22 | 2.20 ± 0.18 |
| Average | 2.78 ± 0.54 | 2.20 ± 0.35 | 1.88 ± 0.35 |

Figures 29A, 29B:
FIG. 29a illustrates retinal image registration using affine model.
FIG. 29b illustrates retinal image registration using methods disclosed herein.
Figure 29C:
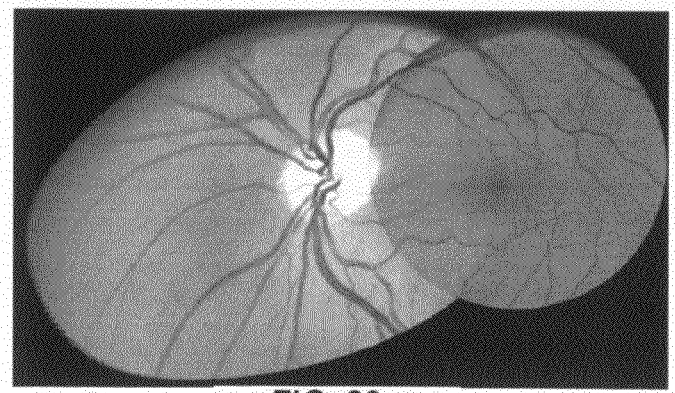
FIG. 29c illustrates retinal image registration using quadratic model.

The methods disclosed exceed the performance of the hybrid registration method that uses the affine model. The hybrid model cannot adjust for the distortion due to the spherical shape of the retina. The quadratic model produces good registrations in the overlapping regions in many cases, however, the model requires at least six CPs, which is not common in real fundus imaging, and a small error in feature detection will cause significant coordinate deformation in the non-overlapping region. A comparison between the affine model, the quadratic model, and the method disclosed is given in FIG. 29. FIG. 29 illustrates retinal image registration using FIG. 29(a) affine model, FIG. 29(b) methods disclosed herein, and FIG. 29(c) quadratic model.

The methods disclosed can correct for distortion sources such as the optical lenses and the retinal surface convexity. Lens optics can produce pincushion distortion. The shape of the eye and retinal surface causes the barrel distortion during image acquisition. Depending on the FOV, the distortion type can be automatically determined, and the amount of distortion can be expressed as a single parameter k in a radial distortion model. Distortion correction is applied to both target and reference images, which violates the general image registration rule that the reference image is never modified. Distortion is corrected in the reference image because each image is acquired from the same eye and has spherical radius. Extending this from pairwise registration to general image montaging, after the first pairwise registration in the montage is performed, the search range for k can be narrowed for the remainder of the montage because it is expected that k should be almost constant for a given eye.

In an embodiment, the EyeCheck database from a diabetic retinopathy screening program in the Netherlands was used to form a data set for retinal atlas generation. Under the imaging protocol of the program, two color fundus images per an eye were available; disk-centered and macula-centered. For the atlas generation purposes, 300 left-eye image pairs (i.e. 600 images) where no pathological feature or imaging artifact presents were randomly selected. The EyeCheck data represents a diverse population that varies in age, gender, and ethnic background.

Figure 30:
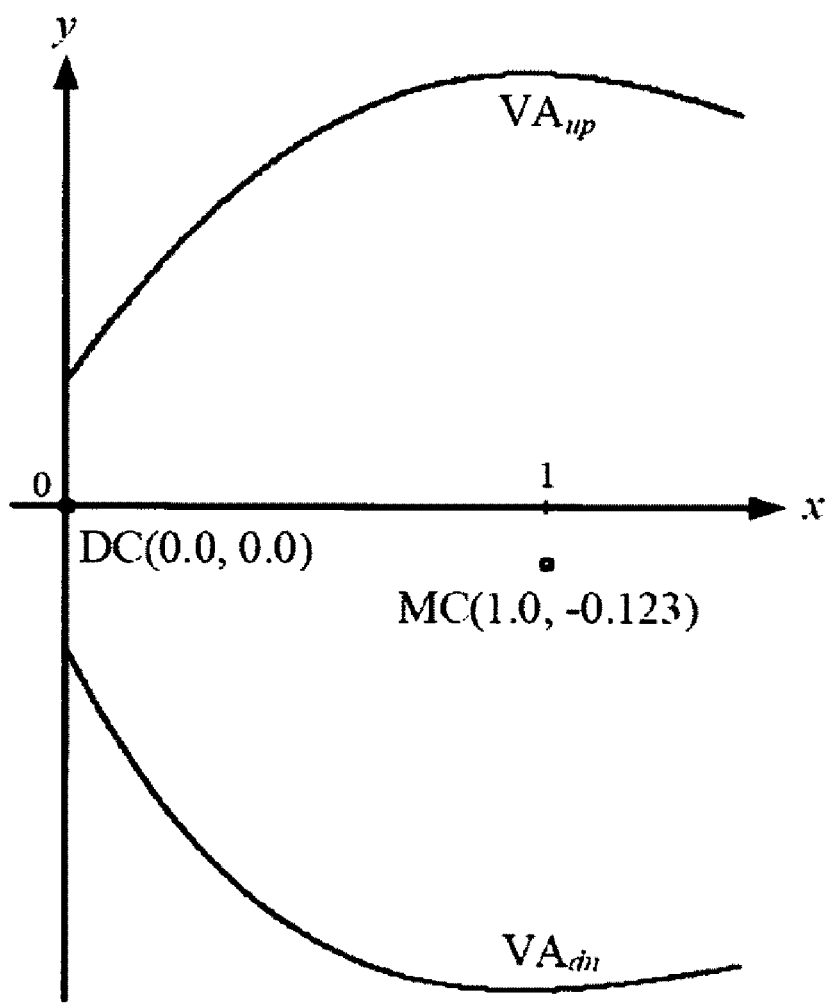
FIG. 30 is a normalized representation of an atlas coordinate system.

Utilizing the methods provided, three atlas landmarks of DC, MC, and VA were selected. Pinning DC location, the point cloud formed by MC points was mapped to the cloud centroid by similarity transformation. In the normalized representation of atlas coordinate system as shown in FIG. 30, the MC centroid is located at a point with approximately 7° rotation of horizontal axis in clockwise direction. The polynomial curve fitting scheme enables description of the VA line pair in the normalized coordinate system. Based on the mean absolute distance residual analysis done for up and down arches independently, the polynomial coefficients of $$\begin{bmatrix} VA_{up} \\ VA_{dn} \end{bmatrix} = \begin{bmatrix} 0.0794 & -0.0776 & -0.7904 & 1.4489 & 0.2674 \\ 0.0901 & -0.6951 & 1.8871 & -2.0075 & -0.3077 \end{bmatrix} [x^4 \ x^3 \ x^2 \ x^1]^T ;$$

were located.

Figures 31A, 31B, 31C:
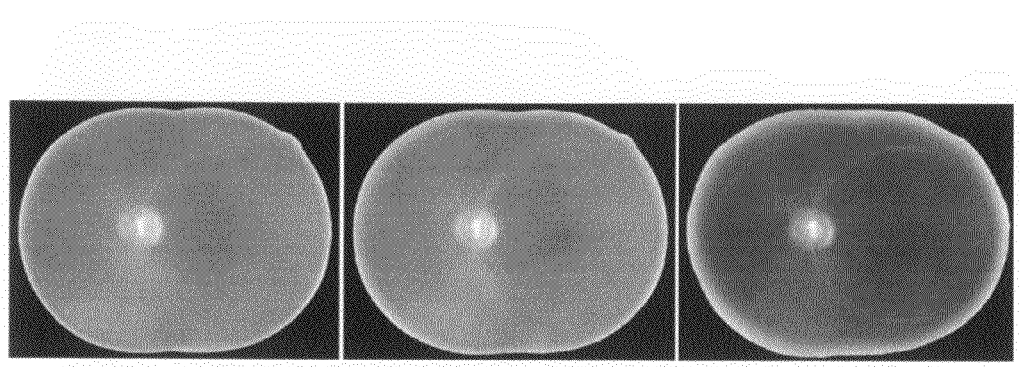
FIG. 31a provides standard deviation in green channel when aligning DC.
FIG. 31b provides standard deviation in green channel when aligning DC and MC.
FIG. 31c provides standard deviation in green channel when aligning DC, MC, and VA.

The training color fundus images were independently warped to the proposed atlas coordinate system, and then the atlas statistics became available. A step-by-step landmark alignment was done to justify the choice of atlas landmark selection. As illustrated in FIG. 31, aligning two points (i.e. DC and MC) in space results in poor representation of normalized atlas coordinate system to give in large standard deviation; 85.8±28.3 in green channel intensity. Once all landmarks including intensity standardization are considered, as shown in FIG. 31(c), the atlas was descriptive enough to describe the general structure of retina with statistics of 77.9±13.5. FIG. 31 provides standard deviation in green channel when aligning FIG. 31 FIG. 31(a) DC, FIG. 31(b) DC and MC, and FIG. 31(c) DC, MC, and VA.

Figure 32A:
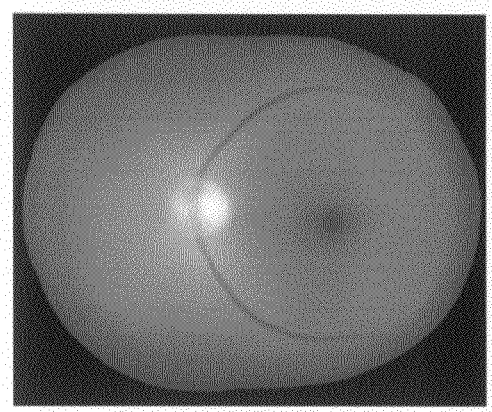
FIG. 32a illustrates retinal atlas statistics (average)
Figure 32B:
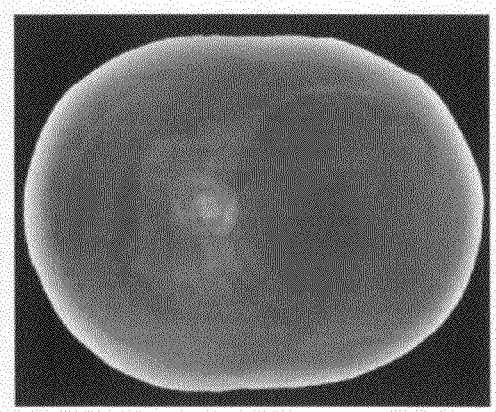
FIG. 32b illustrates retinal atlas statistics (standard deviation)

The average and the standard deviation generated by the methods disclosed are presented in FIG. 32. FIG. 32 illustrates retinal atlas statistics; FIG. 32(a) average and FIG. 32(b) standard deviation. The intensity statistics near the atlas image boundary are different from those on the interior because of different image dimensions. Thus the standard error of the mean increases near the atlas boundaries, since fewer images are used to construct the average near the boundary. However, the intensity statistics over the region of interest that includes atlas landmarks, however, can be a useful reference to describe how the retinal image features are distributed.

The methods provided for atlas generation allow for registration of color fundus images to obtain a statistical retinal atlas. The optic disk, macula, and vessel arch form an anatomically-meaning coordinate system within which structures can be located, measured, and compared. Once the statistical atlas is available, test images can be easily checked to see the quantity of how much they are far from the atlas in the aspect of global/local intensity, feature shapes, color distribution, etc. Applications driven by the atlas property include, but are not limited to, automatic diagnosis algorithms for detecting diseases that affect large retinal area, semantic intensity blending methods that highlight abnormalities while suppressing imaging artifacts or background, template-based retinal feature detection algorithms, efficient retinal image archive and retrieval system, and the like.

From a computational anatomy perspective, the atlas can be used to examine questions related to pigmentation and retinal texture differences within different subpopulations, genetic or environmental causes for retinal structure variation (e.g., disk geometry, vessel branching pattern, diameters, or tortuosity), and how the anatomy of the retina changes in the presence of disease processes such as glaucoma, macular degeneration, and diabetes.

In an aspect, the proposed methods can generate test data sets and validate the accuracy of a registration algorithm under test. Any registration method can be applied to the framework for evaluation.

Figures 33A, 33B, 33C:
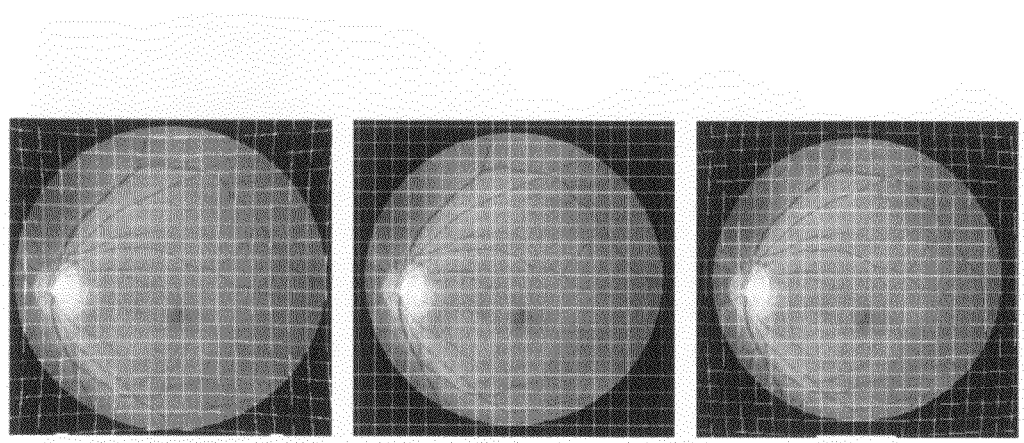
FIG. 33a illustrates radial distortion under pincushion distortion.
FIG. 33b illustrates radial distortion under no distortion.
FIG. 33c illustrates radial distortion under barrel distortion.

Four geometric transform models for retinal image registration were compared: a similarity model, an affine model, a quadratic model, and the radial distortion correction model described herein (also referred to as RADIC). The similarity model considers three parameters: rotation, scale, and translation. The affine model adds a shearing term to the similarity model, and the RADIC model includes an additional parameter k (to model radial distortion) when compared to the affine model. The k in the RADIC model simulates the geometric distortion that depends on the distance from the optical axis; the sign of k determines whether the image is compressed or expanded (see FIG. 33). FIG. 33 illustrates radial distortion under FIG. 33(a) pincushion distortion (k=0.1), FIG. 33(b) no distortion (k=0.0), and FIG. 33(c) barrel distortion (k=−0.1); grid lines are added to address coordinate distortion. Unifying these models, a general form of mathematical expression (i.e. RADIC model) can be obtained by $$X' = (1 + kr^2) \left( \begin{bmatrix} a_{00} & a_{01} \\ a_{10} & a_{11} \end{bmatrix} X + \begin{bmatrix} t_x \\ t_y \end{bmatrix} \right)$$

where r is the distance from the optical axis center to X Therefore, this equation describes the similarity model when $a_{00}=a_{11}$, $a_{01}=-a_{10}$ and k=0, and the affine model is a special case where k=0. The quadratic model is devised to describe the spherical shape of retina to give a second-order approximation of non-linear coordinate distortion by appending quadratic term to the affine model, which is given by $$X' = \begin{bmatrix} a_{00} & a_{01} \\ a_{10} & a_{11} \end{bmatrix} X + \begin{bmatrix} b_{00} & b_{01} & b_{02} \\ b_{10} & b_{11} & b_{12} \end{bmatrix} X_s + \begin{bmatrix} t_x \\ t_y \end{bmatrix}$$

where $$X_s = [x^2 \ y^2 \ xy]^T.$$

Figure 34:
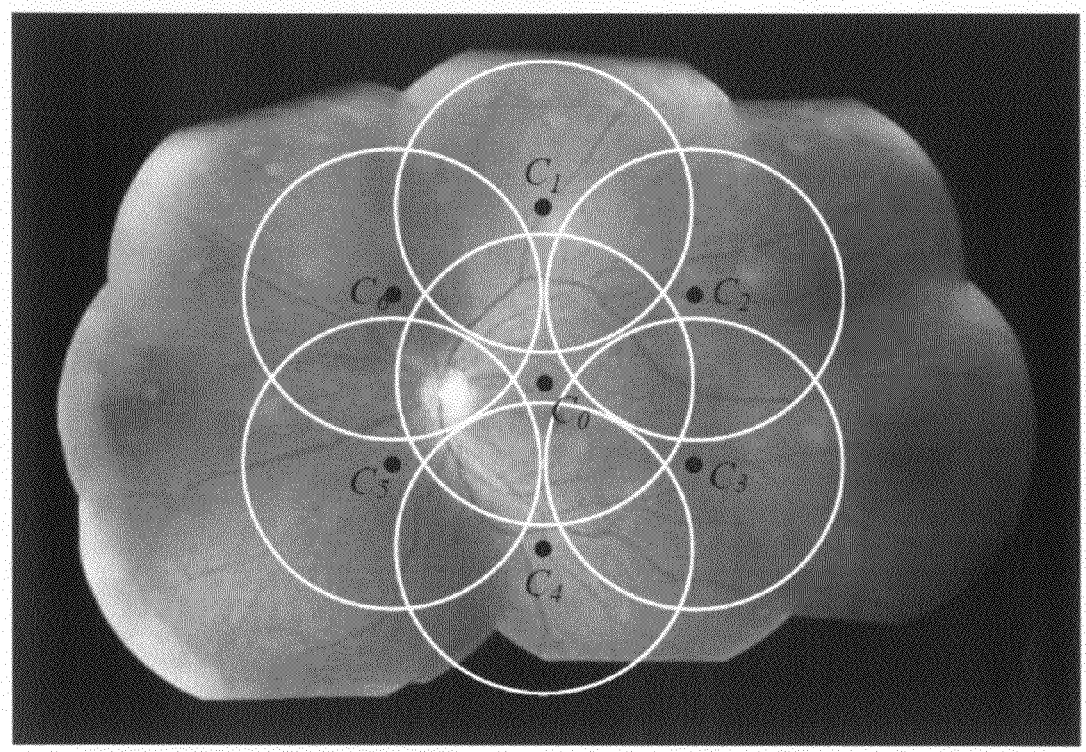
FIG. 34 illustrates the constellation of cuts with ρ=12.5 mm, n=7, m=30%.

The experiment began with montage cutting under percent overlap control with the spatial constellation shown in FIG. 34, and then the individual cut images shown in FIG. 35(a) were further modified using the distortion methods provided herein. FIG. 34 illustrates the constellation of cuts with ρ=12.5 mm, n=7, m=30%. FIG. 35(a) provides images by montage cutting; $C_0, C_1, \ldots$ and $C_6$ from left to right. FIG. 35(b) Simulated retinal images to be used for the input to the registration. FIG. 35(c) Restored images following the registration by the affine model. FIG. 35(d) Intensity difference between the montage cuts (FIG. 35(a)) and the restored images (FIG. 35(c)).

Figures 36A, 36B:
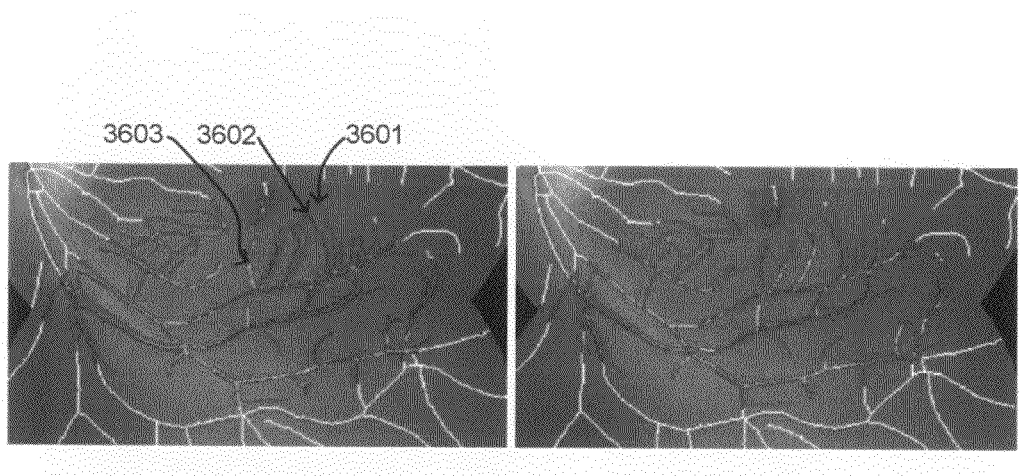
FIG. 36a illustrates pair-wise registration of $C_0$ and $C_4$ using similarity model.
FIG. 36b illustrates pair-wise registration of $C_0$ and $C_4$ using affine model.
Figures 36C, 36D:
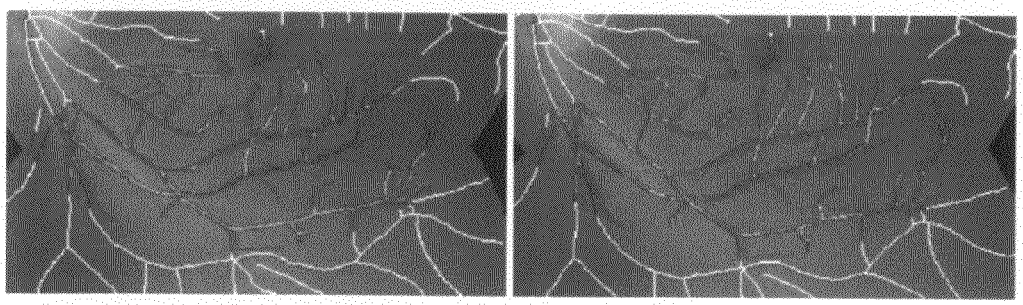
FIG. 36c illustrates pair-wise registration of $C_0$ and $C_4$ using quadratic model.
FIG. 36d illustrates pair-wise registration of $C_0$ and $C_4$ using model provided herein.

In the experiment, the cut $C_0$ was taken as the reference and the others were registered to minimize the CEM. Registration results are given in FIG. 36, where the double vessel center lines serve as visual indicators of the registration error. FIG. 36 illustrates pair-wise registration of $C_0$ and $C_4$ using FIG. 36(a) similarity model (CEM=5.09), FIG. 36(b) affine model (CEM=2.28), FIG. 36(c) quadratic model (CEM=1.98), and FIG. 36(d) model provided herein (CEM=1.74); red (3601) and green (3602) lines represent the vessel centerlines of $C_0$ and $C_4$ in the overlapping region respectively, and completely matched lines are drawn with yellow (3603) lines. Investigation of the CEM can be considered as a validation of registration accuracy limited to the overlapping region. In fact, the registration process has no constraint in the non-overlapping region so the registered geometry in the region is determined by the transformation function evaluated from overlapping region.

Multiple overlapping retinal images were obtained from a normal subject without ocular abnormalities using a 60° color fundus camera (Canon USA, Lake Success, N.Y.). The OIS (Ophthalmic Imaging System, Sacramento, Calif.) stitching function was used to combine retinal images to obtain a 6151×4306 pixels montage image from individual images of 2393×2048 pixels. The methods were implemented in three phases comprising simulated retinal image set generation, pairwise registration, and accuracy evaluation. During the simulated retinal image generation by montage cutting, the user provides the eyeball radius ρ, the number of cuts n, the percent overlap m, and the affine distortion parameters. Using the set of control parameters, the distortion model disclosed herein was then applied to each cut, and the resulting images were input to a registration algorithm under test.

Feature-based registration based on the methods disclosed here, where the vessel centerlines were first detected using the ridge (or valley by duality) detection property of the Hessian operator, and Powell's method was employed to minimize the registration error metric, the centerline error measurement (CEM) given by $$CEM = \frac{1}{L}\sum_{n=0}^{L-1} |p_n^{(r)} - \hat{p}_n^{(t)}|[\text{pixels}]$$

and $$\hat{p}_n^{(t)} = \arg\min_{j \in 0,1,\ldots,L-1} \|p_n^{(r)} - M \cdot p_j^{(t)}\|,$$

where L is the vessel line length, and $p^{(r)}$ represents the point on the vessel centerline in the reference associated with a target point $p^{(t)}$ by a transform matrix M. In particular, depending on the number of available correspondences, model hierarchy was applied to implement the quadratic model. The validation process was initialized by the M that yielded the minimum CEM, and evaluated the registration accuracy by the coordinate restoration process.

Compared to the conventional error measurements the registration error was measured for the entire region of interest (ROI), so the validation can assess the accuracy even for the non-overlapping region. The error measured from overlapping region was referred to as the local error and the error from the entire ROI as the global error. Examples of restored images by the affine model are given in FIG. 35(c). The global error can be visually assessed by examining the difference between the montage cuts and restored images, as shown in FIG. 35(d).

The displacement vectors $v_k(x, y) - \hat{v}_k(x, y)$ can be visualized in a registration error map as shown in FIG. 37. FIG. 37 illustrates registration error maps for the image set for $C_1$, $C_2, \ldots,$ and $C_6$ from left to right using different models. From the dots marked at the initial validation locations, lines are drawn to the restored locations. Displacement vectors in overlapping region are displayed using blue lines. A quantitative assessment of these data used DEM, which corresponded to the average length of validation displacement vector. If the displacement vectors in overlapping regions are focused on, the local error is small compared to the global error since the registration algorithms are designed to minimize the error in the overlapping region.

Figure 38A:
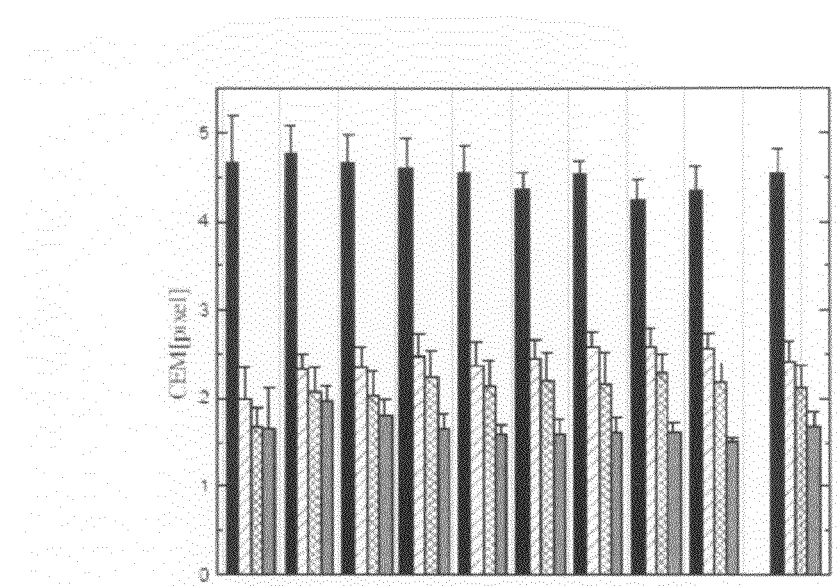
FIG. 38 is a graphical representation of experimental results measuring performance of registration algorithms.
Figure 38B:
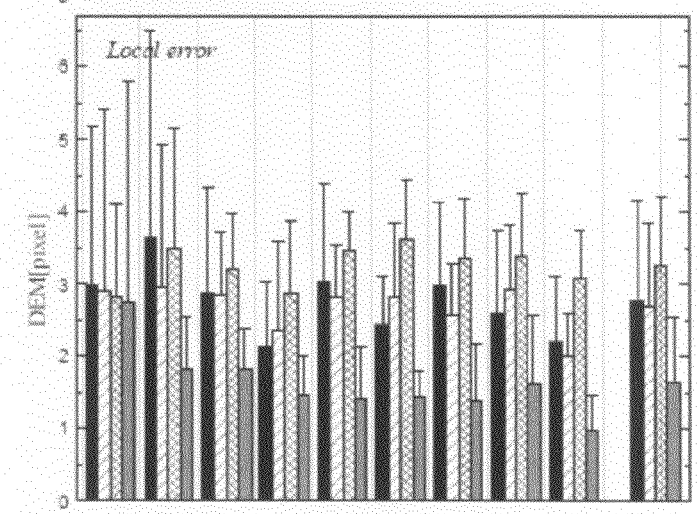
Figure 38C:
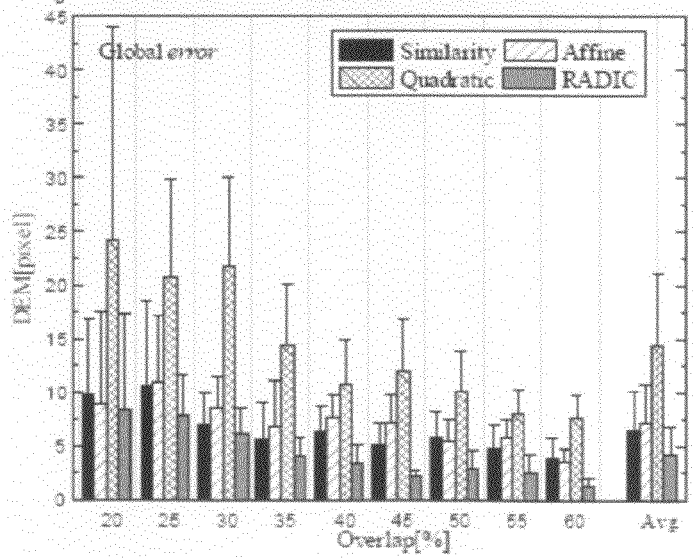

A checkpoint of registration accuracy for the partially overlapped images is how much inter-image overlap affects the accuracy. Unlike the temporal or multimodal registrations, the performance of spatial retinal image registration algorithms can be assessed by determining the minimum overlap required to give acceptable results. In this experiment, the simulated retinal image set was generated by varying the percentage of overlap. The results of this experiment are shown in FIG. 38 for each of the registration algorithms, in which the quadratic model has a large global error while achieving good vessel centerline alignment within the overlapping region and relatively small DEMs are reported for the similarity model and the affine model that have high CEM. The experiment proved the RADIC model works well in the aspects of CEM and DEM.

This validation example of pair-wise fundus image registration concludes the RADIC model outperforms the quadratic, affine, and similarity models both in terms of local and global errors for these simulated images. For the quadratic model, registration accuracy generally increases as the inter-image overlap increases. An interesting observation from these experiments can be seen by comparing the registration errors of the quadratic and the similarity models. As the amount of inter-image overlap increases, a more accurate model of the retinal curvature is required align image pairs. Thus, the registration performance of the quadratic model improves dramatically as the percent overlap increases, while the rigidness of the similarity model limits the accuracy for high overlap percentages.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for image distortion correction, comprising:
   receiving a target image and a reference image;
   correcting radial distortion in the target image and the reference image according to a distortion parameter;
   detecting feature correspondence points in the distortion corrected target image and the distortion corrected reference image;
   initializing an affine registration model with the feature correspondence points;

minimizing vessel centerline error measure (CEM) between the distortion corrected target image and the distortion corrected reference image to determine an optimal distortion parameter and an optimal affine registration model;

correcting radial distortion in the target image and the reference image according to the optimal distortion parameter;

applying an affine transform to the optimally distortion corrected target image and the optimally distortion corrected reference image according to the optimal affine registration model;

combining the transformed optimally distortion corrected target image and the transformed optimally distortion corrected reference image into a montage image; and outputting the montage image.

2. The method of claim 1, wherein the target image and the reference image are retinal images.

3. The method of claim 2, wherein feature correspondence points comprise measurements derived from vessel lines, vessel line branch points, and vessel crossings.

4. The method of claim 1, wherein detecting feature correspondence points in the distortion corrected target image and the distortion corrected reference image further comprises:

for each feature correspondence point, determining a spatial and vector space correlation; and determining two feature correspondence points having the highest spatial and vector space correlation.

5. The method of claim 2, wherein correcting radial distortion further comprises:

determining a point u on the target image;

transforming point u as a function of position off of an optical axis to determine a distorted point v; and correcting for distortion by estimating $\hat{v}$ from u using $$\hat{v} = u \cdot \left(1 + \sum_{n=1}^{\infty} k_n r^{2n}\right),$$

wherein $k_n$ is the distortion parameter and r is the distance from an optical axis center to u.

6. The method of claim 5, wherein $k_n$ is determined by a bisection search over an interval that is determined from properties of an imaged object and an image acquisition system.

7. The method of claim 5, wherein an optimal affine registration model for $k_n$ is determined by a minimization method to find minimum vessel centerline error measure (CEM) between the target image and the reference image.

8. The method of claim 7, wherein $$CEM = \frac{1}{N}\sum_{n=0}^{N-1} |v_n^{(r)} - \hat{v}_n| = \frac{1}{N}\sum_{n=0}^{N-1} |v_n^{(r)} - v_n^{(t)}M|,$$

wherein N is a vessel line length and $v^{(r)}$ is a closest point in the reference image after transforming a point $v^{(t)}$ in the target image.

9. The method of claim 1, wherein if two pixels overlap in the montage image creating an overlap pixel, then determine an intensity of the overlap pixel by a distance weighted blending scheme.

10. A computer readable storage medium storing computer executable instructions thereon for image distortion correction, the computer executable instructions comprising:

receiving a target image and a reference image;

correcting radial distortion in the target image and the reference image according to a distortion parameter;

detecting feature correspondence points in the distortion corrected target image and the distortion corrected reference image;

initializing an affine registration model with the feature correspondence points;

minimizing vessel centerline error measure (CEM) between the distortion corrected target image and the distortion corrected reference image to determine an optimal distortion parameter and an optimal affine registration model;

correcting radial distortion in the target image and the reference image according to the optimal distortion parameter;

applying an affine transform to the optimally distortion corrected target image and the optimally distortion corrected reference image according to the optimal affine registration model;

combining the transformed optimally distortion corrected target image and the transformed optimally distortion corrected reference image into a montage image; and outputting the montage image.

11. The computer readable storage medium of claim 10, wherein the target image and the reference image are retinal images.

12. The computer readable storage medium of claim 11, wherein feature correspondence points comprise measurements derived from vessel lines, vessel line branch points, and vessel crossings.

13. The computer readable storage medium of claim 10, wherein detecting feature correspondence points in the distortion corrected target image and the distortion corrected reference image further comprises:

for each feature correspondence point, determining a spatial and vector space correlation; and determining two feature correspondence points having the highest spatial and vector space correlation.

14. The computer readable storage medium of claim 11, wherein correcting radial distortion further comprises:

determining a point u on the target image;

transforming point u as a function of position off of an optical axis to determine a distorted point v; and correcting for distortion by estimating $\hat{v}$ from u using $$\hat{v} = u \cdot \left(1 + \sum_{n=1}^{\infty} k_n r^{2n}\right),$$

wherein $k_n$ is the distortion parameter and r is the distance from an optical axis center to u.

15. The computer readable storage medium of claim 14, wherein $k_n$ is determined by a bisection search over an interval that is determined from properties of an imaged object and an image acquisition system.

16. The computer readable storage medium of claim 14, wherein an optimal affine registration model for $k_n$ is determined by a minimization method to find minimum vessel centerline error measure (CEM) between the target image and the reference image.

17. The computer readable storage medium of claim 16, wherein $$CEM = \frac{1}{N}\sum_{n=0}^{N-1} |v_n^{(r)} - \hat{v}_n| = \frac{1}{N}\sum_{n=0}^{N-1} |v_n^{(r)} - v_n^{(t)}M|,$$

wherein N is a vessel line length and $v^{(r)}$ is a closest point in the reference image after transforming a point $v^{(t)}$ in the target image.

18. The computer readable storage medium of claim 10, wherein if two pixels overlap in the montage image creating an overlap pixel, then determine an intensity of the overlap pixel by a distance weighted blending scheme.

19. A system for image distortion correction, comprising:
a memory, configured for storing image data; and
a processor, coupled to the memory, configured for
receiving a target image and a reference image,
correcting radial distortion in the target image and the reference image according to a distortion parameter,
detecting feature correspondence points in the distortion corrected target image and the distortion corrected reference image,
initializing an affine registration model with the feature correspondence points,
minimizing vessel centerline error measure (CEM) between the distortion corrected target image and the distortion corrected reference image to determine an optimal distortion parameter and an optimal affine registration model,
correcting radial distortion in the target image and the reference image according to the optimal distortion parameter,
applying an affine transform to the optimally distortion corrected target image and the optimally distortion corrected reference image according to the optimal affine registration model,
combining the transformed optimally distortion corrected target image and the transformed optimally distortion corrected reference image into a montage image, and
outputting the montage image.

20. The system of claim 19, wherein the target image and the reference image are retinal images.

21. The system of claim 20, wherein feature correspondence points comprise measurements derived from vessel lines, vessel line branch points, and vessel crossings.

22. The system of claim 19, wherein detecting feature correspondence points in the distortion corrected target image and the distortion corrected reference image further comprises:
for each feature correspondence point, determining a spatial and vector space correlation; and
determining two feature correspondence points having the highest spatial and vector space correlation.

23. The system of claim 22, wherein correcting radial distortion further comprises:
determining a point u on the target image;
transforming point u as a function of position off of an optical axis to determine a distorted point v; and
correcting for distortion by estimating $\hat{v}$ from u using $$\hat{v} = u \cdot \left(1 + \sum_{n=1}^{\infty} k_n r^{2n}\right),$$

wherein $k_n$ is the distortion parameter and r is the distance from an optical axis center to u.

24. The system of claim 23, wherein $k_n$ is determined by a bisection search over an interval that is determined from properties of an imaged object and an image acquisition system.

25. The system of claim 23, wherein an optimal affine registration model for $k_n$ is determined by a minimization method to find minimum vessel centerline error measure (CEM) between the target image and the reference image.

26. The system of claim 25, wherein $$CEM = \frac{1}{N}\sum_{n=0}^{N-1} |v_n^{(r)} - \hat{v}_n| = \frac{1}{N}\sum_{n=0}^{N-1} |v_n^{(r)} - v_n^{(t)}M|,$$

wherein N is a vessel line length and $v^{(r)}$ is a closest point in the reference image after transforming a point $v^{(t)}$ in the target image.

27. The system of claim 19, wherein if two pixels overlap in the montage image creating an overlap pixel, then determine an intensity of the overlap pixel by a distance weighted blending scheme.

* * * * *